United States Patent
Agiwal et al.

(10) Patent No.: US 11,576,191 B2
(45) Date of Patent: Feb. 7, 2023

(54) METHOD AND APPARATUS FOR HANDLING CONFIGURED GRANT TYPE 1 FOR VEHICLE-TO-EVERYTHING (V2X) COMMUNICATION

(71) Applicant: Samsung Electronics Co., Ltd., Suwon-si (KR)

(72) Inventors: Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 17/247,822

(22) Filed: Dec. 23, 2020

(65) Prior Publication Data

US 2021/0195613 A1 Jun. 24, 2021

Related U.S. Application Data

(60) Provisional application No. 62/953,107, filed on Dec. 23, 2019.

(51) Int. Cl.
*H04W 72/12* (2009.01)
*H04W 4/40* (2018.01)
*H04W 72/14* (2009.01)

(52) U.S. Cl.
CPC ......... *H04W 72/1242* (2013.01); *H04W 4/40* (2018.02); *H04W 72/14* (2013.01)

(58) Field of Classification Search
CPC ... H04W 72/10; H04W 72/085; H04W 72/06; H04W 72/02; H04W 24/10;
(Continued)

(56) References Cited

U.S. PATENT DOCUMENTS

2017/0366920 A1 12/2017 Agiwal
2018/0278315 A1 9/2018 Wu et al.
(Continued)

FOREIGN PATENT DOCUMENTS

EP 3337277 A1 * 6/2018 ............... H04L 1/18
EP 3397015 A1 * 10/2018 ........ H04W 28/0278
(Continued)

OTHER PUBLICATIONS

International Search Report and Written Opinion of the International Searching Authority dated Mar. 30, 2021 in connection with International Application No. PCT/KR2020/019045, 7 pages.
(Continued)

*Primary Examiner* — David Q Nguyen

(57) ABSTRACT

A communication method and system for converging a $5^{th}$ generation (5G) communication system for supporting higher data rates beyond a $4^{th}$ generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method performed by a terminal in a wireless communication system is provided. The method includes identifying that sidelink channel state information (SL-CSI) reporting is triggered; identifying whether SL resources are allocated for new transmission; performing a logical channel prioritization for the SL resources; and determining whether to trigger a scheduling request for the SL-CSI reporting based on a result of the logical channel prioritization.

16 Claims, 13 Drawing Sheets

(58) Field of Classification Search
CPC ... H04W 84/005; H04W 80/02; H04W 72/12; H04W 72/04; H04W 4/40; H04W 72/14; H04W 72/1242; H04W 76/14; H04L 5/0057; H04L 5/0062
USPC .................................. 370/328, 329, 330, 331
See application file for complete search history.

(56) References Cited

U.S. PATENT DOCUMENTS

2020/0092685 A1* 3/2020 Fehrenbach .......... H04W 36/18
2020/0328861 A1* 10/2020 Malladi ................ H04L 5/0007

FOREIGN PATENT DOCUMENTS

| KR | 10-2017-0143453 A | 12/2017 | | |
|---|---|---|---|---|
| WO | WO-2021090248 A1 * | 5/2021 | ........... | H04L 5/0053 |
| WO | WO-2021091339 A1 * | 5/2021 | ........... | H04B 7/0626 |

OTHER PUBLICATIONS

Interdigital Inc., "RAN2 Aspects of CQI/RI Reporting," R2-1914870, 3GPP RAN WG2 Meeting #108, Reno, USA, Nov. 18-22, 2019, 4 pages.
Lg Electronics Inc., "Discussion on measurement and report in NR SL," R2-1915517, 3GPP TSG RAN WG2 Meeting #108, Reno, USA, Nov. 18-22, 2019, 6 pages.
Mediatek Inc., "Sidelink CSI report," R2-1916189, 3GPP TSG-RAN WG2 Meeting #108, Reno, USA, Nov. 18-22, 2019, 2 pages.
Zte et al., "Discussion on CSI and RSRP report," R2-1914537, 3GPP TSG RAN WG2 Meeting #108, Reno, USA, Nov. 18-22, 2019, 4 pages.
European Patent Office, "Supplementary European Search Report," dated Oct. 6, 2022, in connection with European Patent Application No. 20904464.3, 10 pages.
LG Electronics: "5G V2X with NR sidelink", RP-192744, 3GPP TSG RAN meeting #86, 53 pages.
OPPO: "Left issues on CSI report for NR-V2X", R2-1914462, 3GPP TSG-RAN WG2 Meeting #108, 3 pages.

* cited by examiner

METHOD AND APPARATUS FOR HANDLING CONFIGURED GRANT TYPE 1 FOR VEHICLE-TO-EVERYTHING (V2X) COMMUNICATION

CROSS-REFERENCE TO RELATED APPLICATION

This application is based on and claims priority under 35 U.S.C. § 119 (e) of a U.S. Provisional Patent Application No. 62/953,107, filed on Dec. 23, 2019 in the U.S. Patent and Trademark Office, the disclosure of which is incorporated by reference herein in its entirety.

BACKGROUND

1. Field

The disclosure relates to a method of handling configured grant type 1 for vehicle-to-everything (V2X) communication.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also referred to as a 'beyond 4G network' or a 'post long term evolution (LTE) System.' The 5G wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports the voice service and data service. The 4G wireless communication system has been developed to provide high-speed data service. However, the 4G wireless communication system currently suffers from lack of resources to meet the growing demand for high speed data services. Therefore, the 5G wireless communication system (also referred as next generation radio or new radio (NR)) is being developed to meet the growing demand of various services with diverse requirements, e.g., high-speed data services, support ultra-reliability and low-latency applications.

In addition, the 5G wireless communication system is expected to address different use cases having quite different requirements in terms of data rate, latency, reliability, mobility etc. However, it is expected that the design of the air-interface of the 5G wireless communication system will be flexible enough to serve user equipments (UEs) having quite different capabilities depending on the use case and market segment in which the UE caters service to the end customer. Exemplary use cases the 5G wireless communication system is expected to address includes enhanced mobile Broadband (eMBB), massive machine type communication (m-MTC), ultra-reliable low-latency communication (URLL), etc. The eMBB requirements (e.g., tens of Gbps data rate, low-latency, high-mobility and so on) address the market segment representing the wireless broadband subscribers needing internet connectivity everywhere, all the time and on the go. The m-MTC requirements (e.g., very high connection density, infrequent data transmission, very long battery life, low mobility address and so on) address the market segment representing the IoT/IoE envisioning connectivity of billions of devices. The URLL requirements (e.g., very low latency, very high reliability, variable mobility and so on) address the market segment representing the Industrial automation application and vehicle-to-vehicle/vehicle-to-infrastructure communication that is foreseen as one of the enablers for autonomous cars.

In the 5G wireless communication system operating in higher frequency (mmWave) bands, UE and next generation node B (gNB) communicate with each other using beamforming. Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit (TX) beam patterns of different directions. Each of these TX beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these RX beam patterns can be also referred as RX beam.

The 5G wireless communication system supports standalone mode of operation as well dual connectivity (DC). In DC, a multiple RX/TX UE may be configured to utilize resources provided by two different nodes (or node Bs (NBs)) connected via non-ideal backhaul. One node acts as the master node (MN) and the other as the secondary node (SN). The MN and SN are connected via a network interface and at least the MN is connected to the core network. NR also supports multi-radio access technology (RAT) DC (MR-DC) operation whereby a UE in radio resource control (RRC)_CONNECTED is configured to utilize radio resources provided by two distinct schedulers, located in two different nodes connected via a non-ideal backhaul and providing either evolved universal mobile telecommunications system (UMTS) terrestrial radio access (E-UTRA) (i.e., if the node is a next generation (ng)-evolved node B (eNB)) or NR access (i.e., if the node is a gNB).

In NR, for a UE in RRC_CONNECTED not configured with carrier aggregation (CA)/DC, there is only one serving cell comprising of the primary cell (PCell). For a UE in RRC_CONNECTED configured with CA/DC, the term 'serving cells' is used to denote the set of cells comprising of the special cell(s) (SpCell(s)) and all secondary cells (SCells).

In NR, the term 'master cell group' (MCG) refers to a group of serving cells associated with the MN, comprising of the PCell and optionally one or more SCells. In NR, the term 'secondary cell group (SCG)' refers to a group of serving cells associated with the SN, comprising of the primary SCG cell (PSCell) and optionally one or more SCells. In NR, PCell refers to a serving cell in MCG, operating on the primary frequency, in which the UE either performs the initial connection establishment procedure or initiates the connection re-establishment procedure. In NR, for a UE configured with CA, SCell is a cell providing additional radio resources on top of SpCell. PSCell refers to a serving cell in SCG in which the UE performs random access (RA) when performing the reconfiguration with synchronization procedure. For DC operation, the term SpCell' refers to the PCell of the MCG or the PSCell of the SCG, otherwise the term SpCell' refers to the PCell.

In the 5G wireless communication system, physical downlink control channel (PDCCH) is used to schedule downlink (DL) transmissions on physical downlink shared channel (PDSCH) and uplink (UL) transmissions on physical uplink shared channel (PUSCH), where the downlink control information (DCI) on PDCCH includes: downlink assignments containing at least modulation and coding format, resource allocation, and hybrid-automatic repeat request (HARQ) information related to DL-SCH; UL scheduling grants containing at least modulation and coding format, resource allocation, and HARQ information related to UL-shared channel (SCH). In addition to scheduling, PDCCH can be used to for: activation and deactivation of configured PUSCH transmission with configured grant; activation and deactivation of PDSCH semi-persistent transmission; notifying one or more user equipments (UEs) of the slot format; notifying one or more UEs of the physical resource block(s) (PRB(s)) and orthogonal frequency division multiplexing (OFDM) symbol(s) where the UE may assume no transmission is intended for the UE; transmission of transmission power control (TPC) commands for PUCCH and PUSCH; transmission of one or more TPC commands for sounding reference signal (SRS) transmissions by one or more UEs; switching a UE's active bandwidth part (BWP); initiating an RA procedure. A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each REG carrying PDCCH carries its own demodulation reference signal (DMRS). Quadrature phase shift keying (QPSK) modulation is used for PDCCH.

In 5G wireless communication system, a list of search space configurations is signaled by gNB for each configured BWP wherein each search configuration is uniquely identified by an identifier (ID). ID of search space configuration to be used for specific purpose such as paging reception, system information (SI) reception, and random access response (RAR) reception is explicitly signaled by gNB. In NR, search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoringsymbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot})\bmod(\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the CORESET associated with the search space. Search space configuration includes the ID of CORESET configuration associated with it. A list of CORESET configurations is signaled by gNB for each configured BWP wherein each CORESET configuration is uniquely identified by an ID. Note that each radio frame is of 10 ms duration. Radio frame is identified by a radio frame number or system frame number. Each radio frame comprises of several slots wherein the number of slots in a radio frame and duration of slots depend on subcarrier spacing (SCS). The number of slots in a radio frame and duration of slots depending on radio frame for each supported SCS is pre-defined in NR. Each CORESET configuration is associated with a list of transmission configuration indicator (TCI) states. One DL reference signal (RS) ID (synchronization signal and physical broadcast channel (PBCH) block (SSB) or channel state information (CSI)-RS) is configured per TCI state. The list of TCI states corresponding to a CORESET configuration is signaled by gNB via RRC signaling. One of the TCI states in TCI state list is activated and indicated to UE by gNB. TCI state indicates the DL TX beam (DL TX beam is quasi co-located (QCLed) with SSB/CSI-RS of TCI state) used by gNB for transmission of PDCCH in the PDCCH monitoring occasions of a search space.

In 5G wireless communication system, bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the SCS can be ordered to change (e.g., to allow different services). A subset of the total cell bandwidth of a cell is referred to as a BWP. BA is achieved by configuring RRC connected UE with BWP(s) and telling the UE which of the configured BWPs is currently the active one. When BA is configured, the UE only has to monitor PDCCH on the one active BWP, i.e., it does not have to monitor PDCCH on the entire DL frequency of the serving cell. In RRC connected state, UE is configured with one or more DL and UL BWPs, for each configured serving cell (i.e., PCell or SCell). For an activated serving cell, there is always one active UL and DL BWP at any point in time. The BWP switching for a serving cell is used to activate an inactive BWP and deactivate an active BWP at a time. The BWP switching is controlled by the PDCCH indicating a DL assignment or a UL grant, by the bwp-Inactivity Timer, by RRC signaling, or by the media access control (MAC) entity itself upon initiation of RA procedure. Upon addition of SpCell or activation of an SCell, the DL BWP and UL BWP indicated by firstActiveDownlinkBWP-Id and firstActiveUplinkBWP-Id respectively are active without receiving PDCCH indicating a DL assignment or a UL grant. The active BWP for a serving cell is indicated by either RRC or PDCCH. For unpaired spectrum, a DL BWP is paired with a UL BWP, and BWP switching is common for both UL and DL. Upon expiry of BWP inactivity timer, UE switches the active DL BWP to the default DL BWP or initial DL BWP (if default DL BWP is not configured).

In the 5G wireless communication system, RA is supported. RA is used to achieve UL time synchronization. RA is used during initial access, handover, RRC connection re-establishment procedure, scheduling request transmission, SCG addition/modification, beam failure recovery and data or control information transmission in UL by non-synchronized UE in RRC CONNECTED state. Several types of RA procedures are supported.

Contention based RA (CBRA): This is also referred as 4-step CBRA. In this type of RA, UE first transmits RA preamble (also referred as message 1 (Msg1)), and then waits for RAR in the RAR window. RAR is also referred as message 2 (Msg2). gNB transmits the RAR on PDSCH. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH TX occasion or RA channel (RACH) occasion (RO)) in which RA preamble was detected by gNB. The RA-RNTI is calculated as follows: RA-RNTI=1+s_id+14*t_id+14*80*f_id+14*80*8*ul_carrier_id, where s_id is the index of the first OFDM symbol of the PRACH occasion, where UE has transmitted Msg1, i.e., RA preamble; 0≤s_id<14; t_id is the index of the first slot of the PRACH occasion (0≤t_id<80); fid is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier. Several RARs for various RA preambles detected by gNB can be multiplexed in the same RAR MAC protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to the first step, i.e., selects RA resource (preamble/RO) and transmits the RA preamble. A backoff may be applied before going back to the first step.

If the RAR corresponding to its RA preamble transmission is received, the UE transmits message 3 (Msg3) in UL grant received in RAR. Msg3 includes message such as RRC connection request, RRC connection re-establishment request, RRC handover confirm, scheduling request, SI request etc. It may include the UE identity (i.e., cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a PDCCH addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to the first step, i.e., selects RA resource (preamble/RO) and transmits the RA preamble. A backoff may be applied before going back to the first step.

Contention free RA (CFRA): This is also referred as legacy CFRA or 4-step CFRA. CFRA procedure is used for scenarios such as handover where low latency is required, timing advance establishment for Scell, etc. eNB (or gNB) assigns to UE dedicated RA preamble. UE transmits the dedicated RA preamble. ENB (or gNB) transmits the RAR on PDSCH addressed to RA-RNTI. RAR conveys RA preamble identifier and timing alignment information. RAR may also include UL grant. RAR is transmitted in RAR window similar to CBRA procedure. CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery, if dedicated preamble(s) are assigned to UE, during first step of RA, i.e., during RA resource selection for Msg1 transmission, UE determines whether to transmit dedicated preamble or non-dedicated preamble. Dedicated preambles are typically provided for a subset of SSBs/CSI-RSs. If there is no SSB/CSI-RS having DL reference signal received power (RSRP) above a threshold among the SSBs/CSI-RSs for which CFRA resources (i.e., dedicated preambles/ROs) are provided by gNB, UE selects non-dedicated preamble. Otherwise, UE selects dedicated preamble. So, during the RA procedure, one RA attempt can be CFRA while another RA attempt can be CBRA.

2-step CBRA: In the first step, UE transmits RA preamble on PRACH and a payload (i.e., MAC PDU) on PUSCH. The RA preamble and payload transmission is also referred as message A (MSGA). In the second step, after MSGA transmission, the UE monitors for a response from the network (i.e., gNB) within a configured window. The response is also referred as message B (MSGB). If CCCH SDU was transmitted in MSGA payload, UE performs contention resolution using the contention resolution information in MSGB. The contention resolution is successful if the contention resolution identity received in MSGB matches first 48 bits of CCCH SDU transmitted in MSGA. If C-RNTI was transmitted in MSGA payload, the contention resolution is successful if UE receives PDCCH addressed to C-RNTI. If contention resolution is successful, RA procedure is considered successfully completed. Instead of contention resolution information corresponding to the transmitted MSGA, MSGB may include fallback information corresponding to the RA preamble transmitted in MSGA. If the fallback information is received, UE transmits Msg3 and performs contention resolution using Msg4 as in CBRA procedure. If contention resolution is successful, RA procedure is considered successfully completed. If contention resolution fails upon fallback (i.e., upon transmitting Msg3), UE retransmits MSGA. If configured window in which UE monitors network response after transmitting MSGA expires and UE has not received MSGB including contention resolution information or fallback information as explained above, UE retransmits MSGA. If the RA procedure is not successfully completed even after transmitting the MSGA configurable number of times, UE fallbacks to 4-step RA procedure, i.e., UE only transmits the RA preamble.

MSGA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MSGA may include UE ID (e.g., random ID, S-TMSI, C-RNTI, resume ID, etc.) along with preamble in the first step. The UE ID may be included in the MAC PDU of the MSGA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, international mobile subscriber identity (IMSI), idle mode ID, inactive mode ID, etc. The UE ID can be different in different scenarios in which UE performs the RA procedure. When UE performs RA after power on (before it is attached to the network), then UE ID is the random ID. When UE performs RA in IDLE state after it is attached to network, the UE ID is S-TMSI. If UE has an assigned C-RNTI (e.g., in connected state), the UE ID is C-RNTI. In case UE is in INACTIVE state, UE ID is resume ID. In addition to UE ID, some addition control information can be sent in MSGA. The control information may be included in the MAC PDU of the MSGA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/base station (BS)/transmit-receive point (TRP) switching indication, connection re-establishment indication, reconfiguration complete or handover complete message, etc.

2-step CFRA: In this case, gNB assigns to UE dedicated RA preamble(s) and PUSCH resource(s) for MSGA transmission. RO(s) to be used for preamble transmission may also be indicated. In the first step, UE transmits RA preamble on PRACH and a payload on PUSCH using the CFRA resources (i.e., dedicated preamble/PUSCH resource/RO). In the second step, after MSGA transmission, the UE monitors for a response from the network (i.e., gNB) within a configured window. If UE receives PDCCH addressed to C-RNTI, RA procedure is considered successfully completed. If UE receives fallback information corresponding to its transmitted preamble, RA procedure is considered successfully completed.

For certain events such has handover and beam failure recovery, if dedicated preamble(s) and PUSCH resource(s) are assigned to UE, during the first step of RA, i.e., during RA resource selection for MSGA transmission, UE determines whether to transmit dedicated preamble or non-dedicated preamble. Dedicated preambles are typically provided for a subset of SSBs/CSI-RSs. If there is no SSB/CSI-RS having DL RSRP above a threshold among the SSBs/CSI-RSs for which CFRA resources (i.e., dedicated preambles/ROs/PUSCH resources) are provided by gNB, UE selects non-dedicated preamble. Otherwise, UE selects dedicated preamble. So, during the RA procedure, one RA attempt can be 2-step CFRA, while another RA attempt can be 2-step CBRA.

Upon initiation of RA procedure, UE first selects the carrier (SUL or NUL). If the carrier to use for the RA procedure is explicitly signaled by gNB, UE selects the signaled carrier for performing RA procedure. If the carrier to use for the RA procedure is not explicitly signaled by gNB; and if the serving cell for the RA procedure is configured with SUL and if the RSRP of the DL pathloss reference is less than rsrp-ThresholdSSB-SUL: UE selects the SUL carrier for performing RA procedure. Otherwise, UE selects the NUL carrier for performing RA procedure. Upon selecting the UL carrier, UE determines the UL and DL BWP for RA procedure as specified in section 5.15 of technical specification (TS) 38.321. UE then determines whether to perform 2-step or 4-step RA for this RA procedure.

If this RA procedure is initiated by PDCCH order and if the ra-PreambleIndex explicitly provided by PDCCH is not 0b000000, UE selects 4-step RA.

Else if 2-step CFRA resources are signaled by gNB for this RA procedure, UE selects 2-step RA.

Else if 4-step CFRA resources are signaled by gNB for this RA procedure, UE selects 4-step RA.

Else if the UL BWP selected for this RA procedure is configured with only 2-step RA resources, UE selects 2-step RA.

Else if the UL BWP selected for this RA procedure is configured with only 4-step RA resources, UE selects 4-step RA.

Else if the UL BWP selected for this RA procedure is configured with both 2-step and 4-step RA resources and RSRP of the DL pathloss reference is below a configured threshold, UE selects 4-step RA. Otherwise, UE selects 2-step RA.

In the 5G wireless communication system, node B (gNB) or base station in cell broadcast SSB including primary and secondary synchronization signals (PSS, SSS) and SI. SI includes common parameters needed to communicate in cell. In the 5G wireless communication system (also referred as next generation radio or NR), SI is divided into the master information block (MIB) and a number of second information blocks (SIBs) where:

the MIB is always transmitted on the broadcast channel (BCH) with a periodicity of 80 milliseconds (ms) and repetitions made within 80 ms, and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms, but the actual transmission repetition periodicity is up to network implementation. The scheduling information in SIB1 includes mapping between SIBs and SI messages, periodicity of each SI message and SI window length. The scheduling information in SIB1 includes an indicator for each SI message, which indicates whether the concerned SI message is being broadcasted or not. If at least one SI message is not being broadcasted, SIB1 may include RA resources (PRACH preamble(s) and PRACH resource(s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window, and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB, while the area specific SIB is applicable within an area referred to as SI area, which consists of one or several cells and is identified by systemInformationAreaID.

UE acquires SIB1 from the camped or serving cell. UE checks the BroadcastStatus bit in SIB 1 for SI message which UE needs to acquire. SI request configuration for SUL is signaled by gNB using the IE si-RequestConfigSUL in SIB1. If the IE si-RequestConfigSUL is not present in SIB1, UE considers that SI request configuration for SUL is not signaled by gNB. SI request configuration for NUL is signaled by gNB using the IE si-RequestConfig in SIB1. If the IE si-RequestConfig is not present in SIB1, UE considers that SI request configuration for NUL is not signaled by gNB. If SI message which UE needs to acquire is not being broadcasted (i.e., BroadcastStatus bit is set to zero), UE initiates transmission of SI request. The procedure for SI request transmission is as follows:

If SI request configuration is signaled by gNB for SUL, and criteria to select SUL are met (i.e., RSRP derived from SSB measurements of camped or serving cell <rsrp-ThresholdSSB-SUL, where rsrp-ThresholdSSB-SUL is signaled by gNB (e.g., in broadcast signaling such as SIB1)): UE initiates transmission of SI request based on Msg1 based SI request on SUL. In other words, UE initiates RA procedure using the PRACH preamble(s) and PRACH resource(s) in SI request configuration of SUL. UE transmits Msg1 (i.e., RA preamble) and waits for acknowledgement for SI request. RA resources (PRACH preamble(s) and PRACH occasions(s)) indicated in SI request configuration of SUL is used for Msg1. Msg1 is transmitted on SUL. If acknowledgement for SI request is received, UE monitors the SI window of the requested SI message in one or more SI period(s) of that SI message.

Else if SI request configuration is signaled by gNB for NUL and criteria to select NUL are met (i.e., NUL is selected if SUL is supported in camped or serving cell and RSRP derived from SSB measurements of camped or serving cell >=rsrp-ThresholdSSB-SUL; OR NUL is selected if SUL is not supported in serving cell): UE initiates transmission of SI request based on Msg1 based SI request on NUL. In other words, UE initiates RA procedure using the PRACH preamble(s) and PRACH resource(s) in SI request configuration of NUL. UE transmits Msg1 (i.e., RA preamble) and waits for acknowledgement for SI request. RA resources (PRACH preamble(s) and PRACH occasions(s)) indicated in SI request configuration of NUL is used for Msg1. Msg1 is transmitted on NUL. If acknowledgement for SI request is received, UE monitors the SI window of the requested SI message in one or more SI period(s) of that SI message.

Else UE initiates transmission of SI request based on Msg3 based SI request. In other words, UE initiates transmission of RRCSystemInfoRequest message. UE transmits Msg1 (i.e., RA preamble) and waits for RAR. Common RA resources (PRACH preamble(s) and PRACH occasions(s)) are used for Msg1. In the UL grant received in RAR, UE transmits RRCSystemInfoRequest message and waits for acknowledgement for SI request (i.e., RRCSystemInfoRequest message). If acknowledgement for SI request (i.e., RRCSystemInfoRequest message) is received, UE monitors the SI window of the requested SI message in one or more SI period(s) of that SI message. Note that if SUL is configured, UL carrier for Msg1 transmission will be selected by UE in similar manner as selected by UE for Msg1 based SI request. SUL is the selected UL carrier, if RSRP derived from SSB measurements of camped or serving cell <rsrp-ThresholdSSB-SUL where rsrp-ThresholdSSB-SUL is signaled by gNB (e.g., in broadcast signaling such as SIB1). NUL is the selected UL carrier, if RSRP derived from SSB measurements of camped or serving cell >=rsrp-Threshold-SSB-SUL where rsrp-ThresholdSSB-SUL is signaled by gNB (e.g., in broadcast signaling such as SIB1).

4G and 5G wireless communication system supports vehicular communication services. Vehicular communication services, represented by vehicle-to-everything (V2X) services, can include vehicle-to-vehicle (V2V), vehicle-to-infrastructure (V2I), vehicle-to-network (V2N) and vehicle-to-pedestrian (V2P). V2X communication is being enhanced to support enhanced V2X use cases in the 5G system, which are broadly arranged into four use case groups:

1) Vehicles platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

2) Extended sensors enable the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or roadside unit (RSU) shares its own perception data obtained from its local sensors with vehicles in proximity, and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

V2X services can be provided by PC5 interface and/or Uu interface. Support of V2X services via PC5 interface is provided by NR sidelink (SL) communication or V2X SL communication, which is a mode of communication whereby UEs can communicate with each other directly over the PC5 interface using NR technology or EUTRA technology respectively without traversing any network node, and is supported when the UE is served by RAN and when the UE is outside of RAN coverage. Only the UEs authorized to be used for V2X services can perform NR or V2X SL communication.

FIG. 1 illustrates that the NG-RAN architecture supports the PC5 interface.

Referring to FIG. 1, SL transmission and reception over the PC5 interface are supported when the UE is inside NG-RAN coverage, irrespective of which RRC state the UE is in, and when the UE is outside NG-RAN coverage. Support of V2X services via the PC5 interface can be provided by NR SL communication and/or V2X SL communication. NR SL communication may be used to support other services than V2X services.

NR or V2X SL communication can support three types of transmission modes. Unicast transmission is characterized by: support of at least one PC5-RRC connection between peer UEs; transmission and reception of control information and user traffic between peer UEs in SL; support of SL HARQ feedback; support of radio link control (RLC) acknowledge mode (AM); and support of SL RLM for both peer UEs to detect radio link failure (RLF). Groupcast transmission is characterized by: transmission and reception of user traffic among UEs belonging to a group in SL; and support of SL HARQ feedback. Broadcast transmission is characterized by: transmission and reception of user traffic among UEs in SL.

The access stratum (AS) protocol stack for the control plane in the PC5 interface consists of RRC, packet data convergence protocol (PDCP), RLC and MAC sublayer, and the physical layer. The AS protocol stack for user plane in the PC5 interface consists of service data adaptation protocol (SDAP), PDCP, RLC and MAC sublayer, and the physical layer. SL radio bearers (SLRB) are categorized into two groups: SL data radio bearers (DRB) for user plane data and SL signaling radio bearers (SRB) for control plane data. Separate SL SRBs using different SL control channels (SCCHs) are configured for PC5-RRC and PC5-S signaling respectively.

The MAC sublayer provides the following services and functions over the PC5 interface: radio resource selection; packet filtering; priority handling between UL and SL transmissions for a given UE; and SL CSI reporting. With logical channel prioritization (LCP) restrictions in MAC, only SL logical channels (LCHs) belonging to the same destination can be multiplexed into a MAC PDU for every unicast, groupcast and broadcast transmission which is associated to the destination. NG-RAN can also control whether an SL LCH can utilize the resources allocated to a configured SL grant Type 1. For packet filtering, a SL shared channel (SL-SCH) MAC header including portions of both Source Layer-2 ID and a Destination Layer-2 ID is added to each MAC PDU as specified in subclause 8.x. LCH identifier (LCD) included within a MAC subheader uniquely identifies a LCH within the scope of the Source Layer-2 ID and Destination Layer-2 ID combination. The following LCHs are used in SL:

SCCH: a SL channel for transmitting control information from one UE to other UE(s);

SL traffic channel (STCH): a SL channel for transmitting user information from one UE to other UE(s); and SL broadcast control channel (SBCCH): a SL channel for broadcasting SL SI from one UE to other UE(s).

The following connections between LCHs and transport channels exist:

SCCH can be mapped to SL-SCH;

STCH can be mapped to SL-SCH; and

SBCCH can be mapped to SL-BCH.

The RRC sublayer provides the following services and functions over the PC5 interface:

Transfer of a PC5-RRC message between peer UEs;

Maintenance and release of a PC5-RRC connection between two UEs; and

Detection of SL RLF for a PC5-RRC connection.

A PC5-RRC connection is a logical connection between two UEs for a pair of Source and Destination Layer-2 IDs which is considered to be established after a corresponding PC5 unicast link is established as specified in TS 23.287. There is one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages are used for a UE to transfer UE capability and SL configuration including SLRB configuration to the peer UE. Both peer UEs can exchange their own UE capability and SL configuration using separate bi-directional procedures in both SL directions. If it is not interested in SL transmission, if SL RLF on the PC5-RRC connection is declared, or if the Layer-2 link release procedure is completed as specified in TS 23.287, UE releases the PC5-RRC connection.

The UE can operate in two modes for resource allocation in SL:

Scheduled resource allocation is characterized by: the UE needs to be RRC_CONNECTED in order to transmit data; and NG-RAN schedules transmission resources.

UE autonomous resource selection is characterized by: the UE can transmit data when inside NG-RAN coverage, irrespective of which RRC state the UE is in, and when outside NG-RAN coverage; and the UE autonomously selects transmission resources from a pool of resources.

For NR SL communication, the UE performs SL transmissions only on a single carrier.

Scheduled Resource Allocation: NG-RAN can dynamically allocate resources to the UE via the SL-RNTI on PDCCH(s) for NR SL communication. In addition, NG-RAN can allocate SL resources to UE with two types of configured SL grants:

With type 1, RRC directly provides the configured SL grant for NR SL communication, and With type 2, RRC provides the periodicity of the configured SL grant while PDCCH can either signal and activate the configured SL grant, or deactivate it. The PDCCH provides the actual grant (i.e., resources) to be used. The PDCCH is addressed to SL-configured scheduling (CS)-RNTI for NR SL communication and SL semi-persistent scheduling V2X (V)-RNTI for V2X SL communication.

For the UE performing NR SL communication, there can be more than one configured SL grant activated at a time on the carrier configured for SL transmission. When beam failure or physical layer problem occurs on NR Uu, the UE can continue using the configured SL grant Type 1. During handover, the UE can be provided with configured SL grants via handover command, regardless of the type. If provided, the UE activates the configured SL grant Type 1 upon reception of the handover command. The UE can send SL BSR to support scheduler operation in NG-RAN. The SL BSRs refer to the data that is buffered in for a group of LCHs (LCG) per destination in the UE. Eight LCGs are used for reporting of the SL BSRs. Two formats, which are SL BSR and truncated SL BSR, are used.

UE Autonomous Resource Allocation: The UE autonomously selects SL grant from a pool of resources provided by broadcast SI or dedicated signaling while inside NG-RAN coverage or by preconfiguration while outside NG-RAN coverage.

For NR SL communication, the pools of resources can be provided for a given validity area where the UE does not need to acquire a new pool of resources while moving within the validity area, at least when this pool is provided by SIB (e.g., reuse valid area of NR SIB). NR SIB validity mechanism is reused to enable validity area for SL resource pool configured via broadcasted SI. The UE is allowed to temporarily use UE autonomous resource selection with random selection for SL transmission based on configuration of the exceptional transmission resource pool.

For V2X SL transmission, during handover, transmission resource pool configurations including exceptional transmission resource pool for the target cell can be signaled in the handover command to reduce the transmission interruption. In this way, the UE may use the V2X SL transmission resource pools of the target cell before the handover is completed as long as either synchronization is performed with the target cell in case eNB is configured as synchronization source or synchronization is performed with global navigation satellite system (GNSS) in case GNSS is configured as synchronization source. If the exceptional transmission resource pool is included in the handover command, the UE uses randomly selected resources from the exceptional transmission resource pool, starting from the reception of handover command. If the UE is configured with scheduled resource allocation in the handover command, the UE continues to use the exceptional transmission resource pool while the timer associated with handover is running. If the UE is configured with autonomous resource selection in the target cell, the UE continues to use the exceptional transmission resource pool until the sensing results on the transmission resource pools for autonomous resource selection are available. For exceptional cases (e.g., during RLF, during transition from RRC IDLE to RRC CONNECTED or during change of dedicated V2X SL resource pools within a cell), the UE may select resources in the exceptional pool provided in serving cell's SIB21 or in dedicated signaling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

Issue: configured grant (CG) type 1 grant is supported for NR V2X communication. Its use is restricted to SL LCH(s) indicated by gNB. CG type 1 grant is activated immediately upon receiving the handover command. In the scenario where handover command includes CG type 1 grant for target cell, interruption will be avoided for SL LCHs which are allowed to use CG type 1. For other LCHs interruption will still occur as those SL LCHs can be scheduled in dynamic grant and dynamic grant is received only after handover is completed. This interruption can be avoided by configuring exceptional TX resource pool for other LCHs. However, this is not possible as simultaneous configuration of schedules resource allocation and autonomous resource allocation is not supported.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a 5th generation (5G) communication system for supporting higher data rates beyond a $4^{th}$ generation (4G) system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes identifying that sidelink channel state information (SL-CSI) reporting is triggered; identifying whether SL resources are allocated for new transmission; performing a logical channel prioritization for the SL resources; and determining whether to trigger a scheduling request for the SL-CSI reporting based on a result of the logical channel prioritization.

In accordance with another aspect of the disclosure, a terminal in a wireless communication system is provided. The terminal includes a transceiver and a controller coupled with the transceiver. The controller is configured to identify that SL-CSI reporting is triggered, identify whether SL resources are allocated for new transmission, perform a logical channel prioritization for the SL resources, and determine whether to trigger a scheduling request for the SL-CSI reporting based on a result of the logical channel prioritization.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
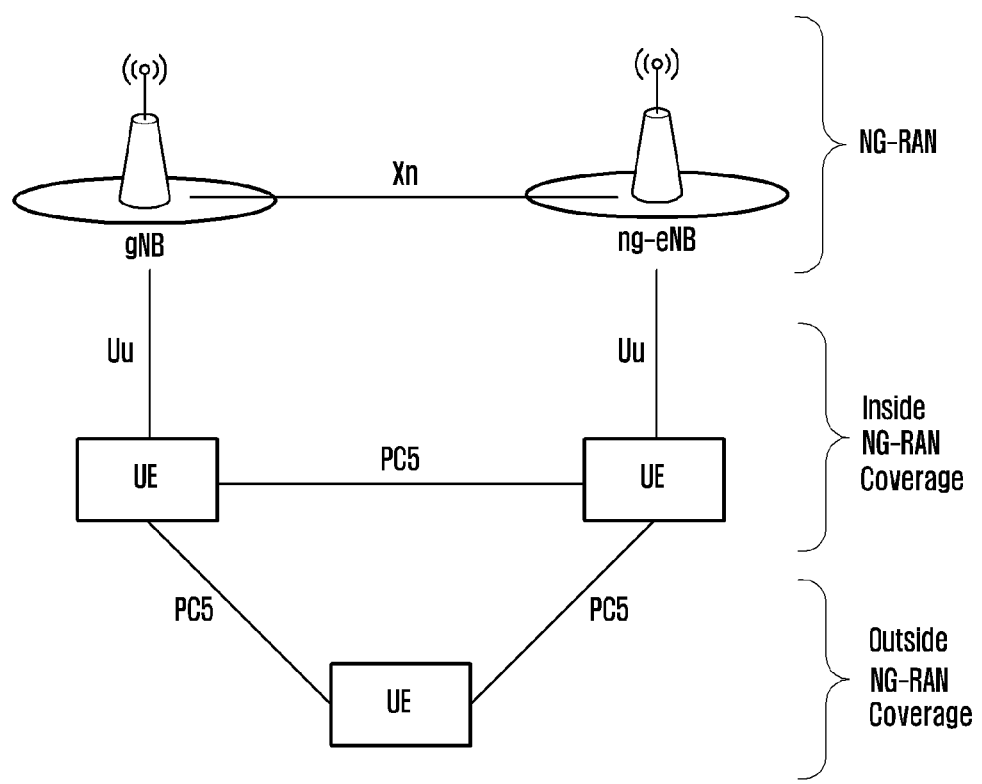
FIG. 1 illustrates that the next generation radio access network (NG-RAN) architecture supports the PC5 interface.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

Handling Configured Grant (CG) Type 1 Grant During Handover

Figure 2:
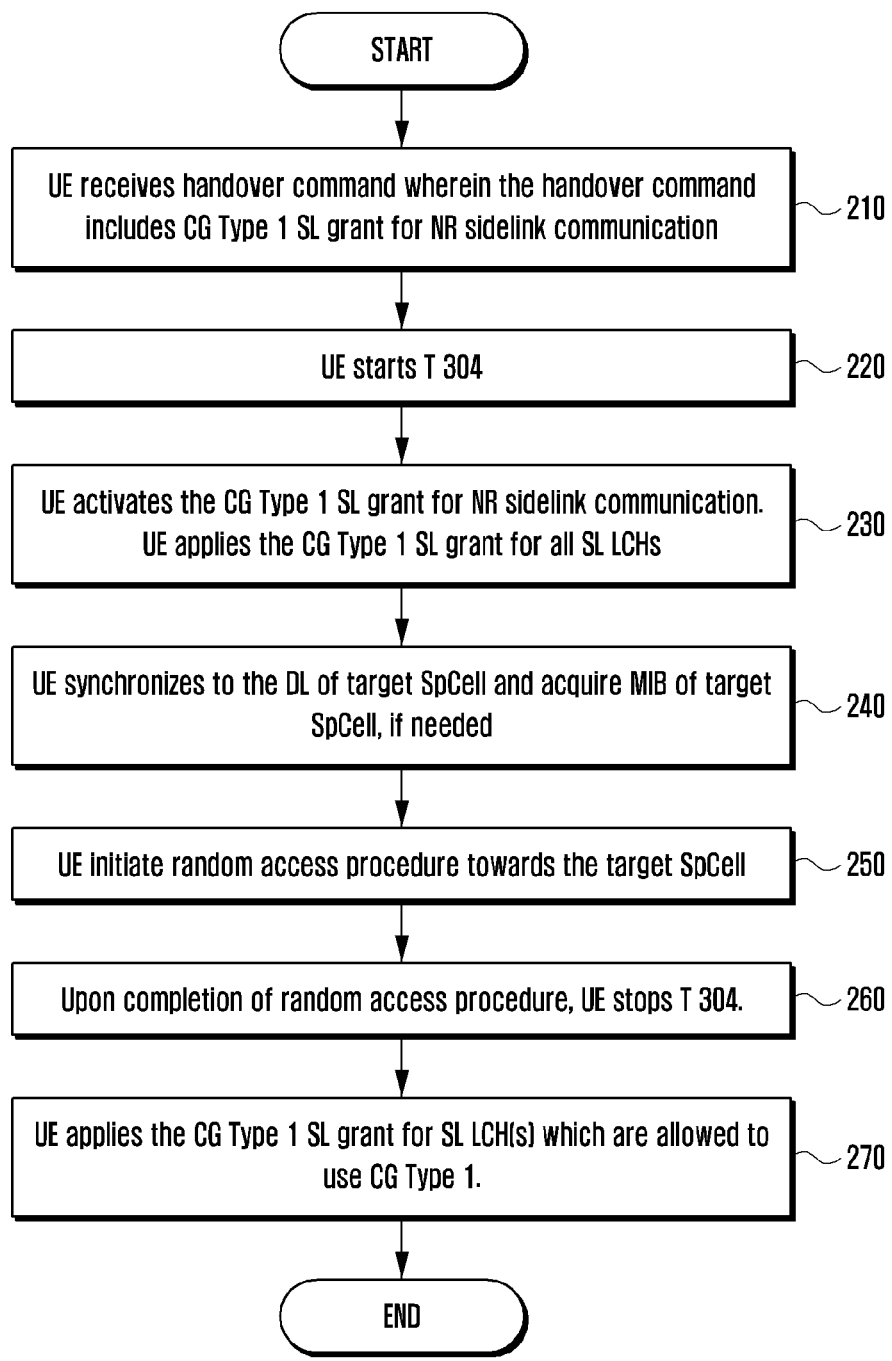
FIG. 2 illustrates an operation of a user equipment (UE) for handling configured grant (CG) Type 1 grant during handover according to an embodiment based on Method 1 of the disclosure.

Method 1:

FIG. 2 illustrates an operation of a UE for handling CG Type 1 grant during handover according to an embodiment based on Method 1 of the disclosure.

UE is in radio resource control (RRC) Connected state and is performing NR sidelink (SL) communication using resource configuration (scheduled resource allocation or autonomous resource allocation) provided by the serving cell (the serving cell can be primary cell (PCell) in an embodiment, or the serving cell can be special cell (SpCell) in another embodiment).

Referring to FIG. 2, in RRC Connected state, UE receives from network (i.e., BS or source PCell or source SpCell) handover or RRC reconfiguration message (e.g., handover command) including reconfigurationWithSync at operation 210. The reconfiguration message configures scheduled resource allocation (also referred as Mode 1) in the target cell (the target cell can be PCell in an embodiment, or the target cell can be SpCell in another embodiment). Specifically, the reconfiguration message includes CG Type 1 SL grant configuration in the target cell for new radio (NR) SL communication. Exceptional resource pool for transmission is not by the reconfiguration message. The reconfiguration message also indicates the one or more SL logical channel(s) (LCH(s)) which are allowed to use CG Type 1 SL grant.

In one method of this disclosure, upon receiving the handover command or RRC reconfiguration message including reconfigurationWithSync: UE starts a timer T 304 at operation 220, and activates the CG Type 1 SL grant for NR SL communication if included in the RRC reconfiguration message at operation 230. UE starts using the CG Type 1 SL grant for NR SL communication as soon as synchronization is performed with gNB in case gNB is configured as synchronization source or synchronization is performed with global navigation satellite system (GNSS) in case GNSS is configured as synchronization source or synchronization is performed with UE transmitting synchronization signal in case UE is configured as synchronization source. UE synchronizes to the downlink (DL) of target SpCell and acquires MIB of target SpCell, if needed, at operation 240. UE initiates random access (RA) procedure towards the target SpCell at operation 250. Upon completion of RA procedure, UE stops the timer T 304 at operation 260. UE applies the CG Type 1 SL grant for SL LCH(s) which are allowed to use CG type 1 at operation 270.

In this method, until the handover is completed (i.e., while the timer T 304 is running), UE uses the CG Type 1 SL grant for all SL LCHs. This means that until the handover is completed, UE does not follow the LCH restrictions indicated by gNB for CG Type 1.

Upon completion of handover, CG Type 1 SL grant is used only for SL LCH(s) indicated by gNB. This means that after the handover is completed, UE follows the LCH restrictions indicated by gNB for CG Type 1. The reconfiguration message indicates the one or more SL LCH(s) which are allowed to use CG Type 1 SL grant.

For example, let's say UE has four SL LCHs (say LCH 1, LCH 2, LCH 3 and LCH 4) established for NR SL communication. Network configures CG Type 1 SL grant in handover command. CG Type 1 SL grant is allowed to be used for LCH 1 and LCH 2 as per configuration received from network. Upon receiving the handover command, UE activates CG Type 1 SL grant. Until the handover is completed, UE uses the CG Type 1 SL grant for SL LCHs 1 to 4. Upon completion of handover, UE uses the CG Type 1 SL grant for SL LCHs 1 and 2.

Figure 3:
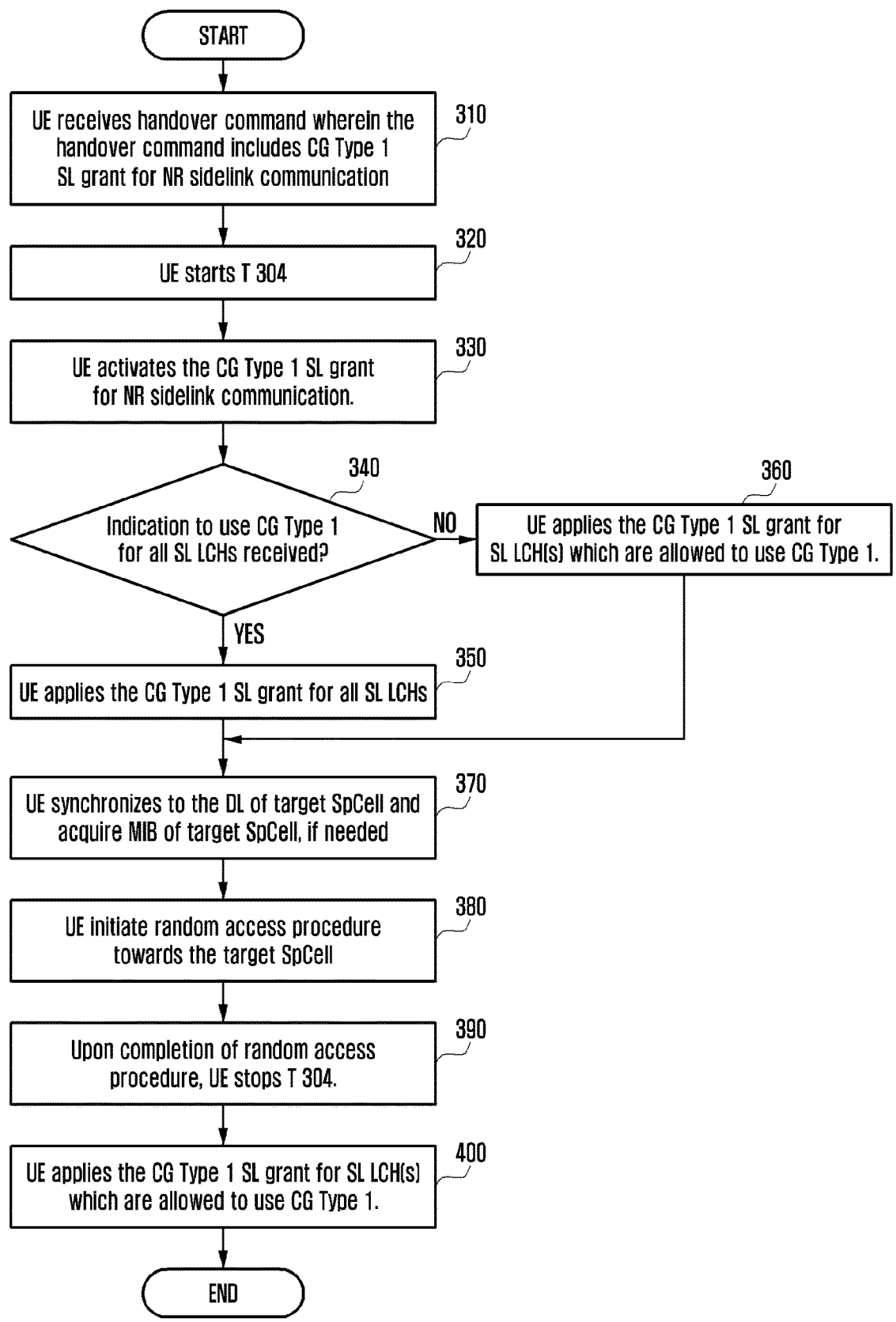
FIG. 3 illustrates an operation of a UE for handling CG Type 1 grant during handover according to another embodiment based on Method 1 of the disclosure.

FIG. 3 illustrates an operation of a UE for handling CG Type 1 grant during handover according to another embodiment based on Method 1 of the disclosure.

Referring to FIG. 3, UE receives handover command at operation 310. The handover command includes CG type 1 SL grant for NR SL communication. UE starts a timer T 304 at operation 320. UE activates the CG Type 1 SL grant for NR SL communication at operation 330.

In an alternate embodiment of this method of disclosure, network may indicate whether UE is allowed to use CG Type 1 for all SL LCHs or only the indicated SL LCHs during handover. Presence of new parameter (UseCGType1forAllSLLCHs) in RRC reconfiguration message can indicate that UE can use CG Type 1 for all SL LCHs during handover. The new parameter (UseCGType1forAllSLLCHs) in RRC reconfiguration message may be set to TRUE to indicate that UE can use CG Type 1 for all SL LCHs during handover.

UE identities whether indication to use CG Type 1 for all SL LCHs is received at operation 340. If the indication is received, UE applies the CG Type 1 SL grant for all SL LCHs at operation 350. Otherwise, UE applies the CG Type 1 SL grant for SL LCH(s) which are allowed to use CG Type 1 at operation 360. UE synchronizes to the DL of target SpCell and acquires MIB of target SpCell, if needed, at operation 370. UE initiates RA procedure towards the target SpCell at operation 380. Upon completion of RA procedure, UE stops the timer T 304 at operation 390. UE applies the CG Type 1 SL grant for SL LCH(s) which are allowed to use CG type 1 at operation 400.

Figure 4:
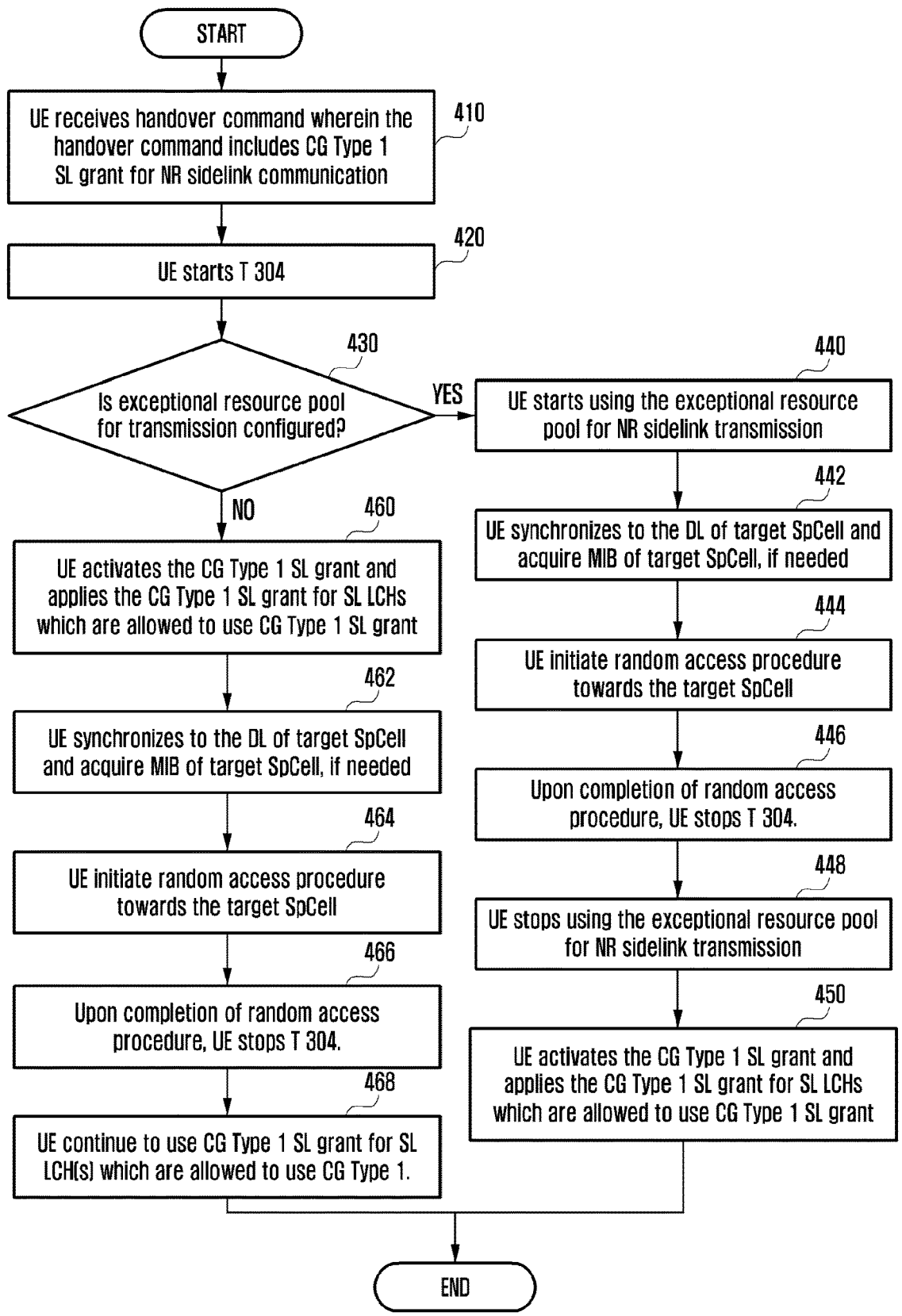
FIG. 4 illustrates an operation of a UE for handling CG Type 1 grant during handover according to an embodiment based on Method 2 of the disclosure.

Method 2:

FIG. 4 illustrates an operation of a UE for handling CG Type 1 grant during handover according to an embodiment based on Method 2 of the disclosure.

UE is in RRC Connected state and is performing NR SL communication using resource configuration (scheduled resource allocation or autonomous resource allocation) provided by the serving cell (the serving cell can be PCell in an embodiment, or the serving cell can be SpCell in another embodiment).

Referring to FIG. 4, in RRC Connected state, UE receives from network (i.e., BS or source PCell or source SpCell) RRC reconfiguration message (e.g., handover command) including reconfigurationWithSync at operation 410. The reconfiguration message configures scheduled resource allocation (also referred as Mode 1) in the target cell (the target cell can be PCell in an embodiment, or the target cell can be SpCell in another embodiment). Specifically, the reconfiguration message includes CG Type 1 SL grant configuration in the target cell for NR SL communication. The exceptional resource pool for transmission may or may not be configured by the reconfiguration message. The reconfiguration message also indicates the one or more SL LCH(s) which are allowed to use CG Type 1 SL grant.

In one method of this disclosure, upon receiving the handover command or RRC reconfiguration message including reconfigurationWithSync: UE starts a timer T 304 at operation 420, and identifies whether exceptional resource pool for transmission is configured at operation 430.

If exceptional resource pool for transmission is configured: CG Type 1 SL grant is activated after handover is completed. UE uses the CG Type 1 SL grant after handover is completed. Until handover is completed UE uses the exception resource pool for NR SL transmission.

UE starts using the exceptional resource pool for NR SL transmission 440. UE synchronizes to the DL of target SpCell and acquires MIB of target SpCell, if needed, at operation 442. UE initiates RA procedure towards the target SpCell at operation 444. Upon completion of RA procedure, UE stops the timer T 304 at operation 446. UE stops using the exceptional resource pool for NR SL transmission at operation 448. UE activates the CG Type 1 SL grant and applies the CG Type 1 SL grant for SL LCHs which are allowed to use CG Type 1 SL grant at operation 450.

If exceptional resource pool for transmission is not configured: UE activates the CG Type 1 SL grant if included in the RRC reconfiguration message. UE starts using the CG Type 1 SL grant for NR SL communication as soon as synchronization is performed with gNB in case gNB is configured as synchronization source or synchronization is performed with GNSS in case GNSS is configured as synchronization source or synchronization is performed with UE transmitting synchronization signal in case UE is configured as synchronization source.

UE uses the CG Type 1 SL grant only for SL LCHs which are allowed to use CG Type 1 SL grant. CG Type 1 SL grant is used only for SL LCH(s) indicated by gNB. The reconfiguration message indicates the one or more SL LCH(s) which are allowed to use CG Type 1 SL grant.

UE activates the CG Type 1 SL grant and applies the CG Type 1 SL grant for SL LCHs which are allowed to use CG Type 1 SL grant at operation 460. UE synchronizes to the DL of target SpCell and acquires MIB of target SpCell, if needed, at operation 462. UE initiates RA procedure towards the target SpCell at operation 464. Upon completion of RA procedure, UE stops the timer T 304 at operation 466. UE continues to use CG Type 1 SL grant for SL LCH(s) which are allowed to use CG Type 1 SL grant at operation 468.

Figure 5:
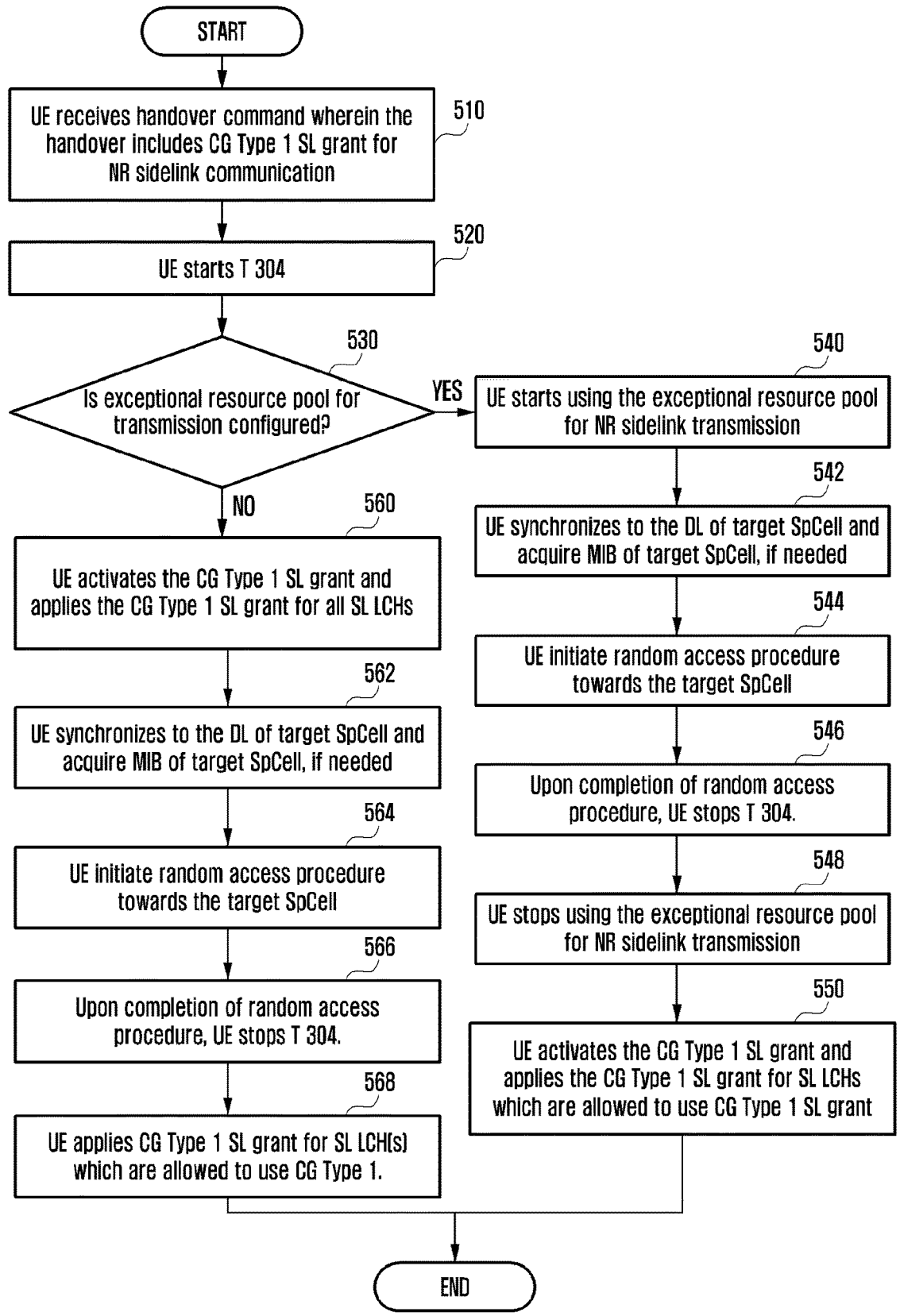
FIG. 5 illustrates an operation of a UE for handling CG Type 1 grant during handover according to an embodiment based on Method 3 of the disclosure.

Method 3:

FIG. 5 illustrates an operation of a UE for handling CG Type 1 grant during handover according to an embodiment based on Method 3 of the disclosure.

Referring to FIG. 5, UE receives handover command at operation 510. The handover command includes CG Type 1 SL grant for NR SL communication. UE starts a timer T 304 at operation 520.

In one method of this disclosure, upon receiving the handover command or RRC reconfiguration message including reconfigurationWithSync: UE identifies whether exceptional resource pool for transmission is configured at operation 530.

If exceptional resource pool for transmission is configured: CG Type 1 SL grant is activated after handover is completed. UE uses the CG Type 1 SL grant after handover is completed. Until handover is completed UE uses the exception resource pool for NR SL transmission.

UE starts using the exceptional resource pool for NR SL transmission 540. UE synchronizes to the DL of target SpCell and acquires MIB of target SpCell, if needed, at operation 542. UE initiates RA procedure towards the target SpCell at operation 544. Upon completion of RA procedure, UE stops the timer T 304 at operation 546. UE stops using the exceptional resource pool for NR SL transmission at operation 548. UE activates the CG Type 1 SL grant and applies the CG Type 1 SL grant for SL LCHs which are allowed to use CG Type 1 SL grant at operation 550.

If exceptional resource pool for transmission is not configured: UE activates the CG Type 1 SL grant if included in the RRC reconfiguration message. UE starts using the CG Type 1 SL grant for NR SL communication as soon as synchronization is performed with gNB in case gNB is configured as synchronization source or synchronization is performed with GNSS in case GNSS is configured as synchronization source or synchronization is performed with UE transmitting synchronization signal in case UE is configured as synchronization source.

Until the handover is completed (i.e., while the timer T 304 is running), UE uses the CG Type 1 SL grant for all SL LCHs. This means that until the handover is completed, UE does not follow the LCH restrictions indicated by gNB for CG Type 1. Upon completion of handover, CG Type 1 SL grant is used only for SL LCH(s) indicated by gNB. This means that after the handover is completed, UE follows the LCH restrictions indicated by gNB for CG Type 1. The reconfiguration message indicates the one or more SL LCH(s) which are allowed to use CG Type 1 SL grant. For example, let's say UE has four SL LCHs (say LCH 1, LCH 2, LCH 3 and LCH 4) established for NR SL communication. Network configures CG Type 1 SL grant in handover command. CG Type 1 SL grant is allowed to be used for LCH 1 and LCH 2 as per configuration received from network. Upon receiving the handover command, UE activates CG Type 1 SL grant. Until the handover is completed, UE uses the CG Type 1 SL grant for SL LCHs 1 to 4. Upon completion of handover, UE uses the CG Type 1 SL grant for SL LCHs 1 and 2.

UE activates the CG Type 1 SL grant and applies the CG Type 1 SL grant for all SL LCHs at operation 560. UE synchronizes to the DL of target SpCell and acquires MIB of target SpCell, if needed, at operation 562. UE initiates RA procedure towards the target SpCell at operation 564. Upon completion of RA procedure, UE stops the timer T 304 at operation 566. UE applies CG Type 1 SL grant for SL LCH(s) which are allowed to use CG Type 1 SL grant at operation 568.

Figure 6:
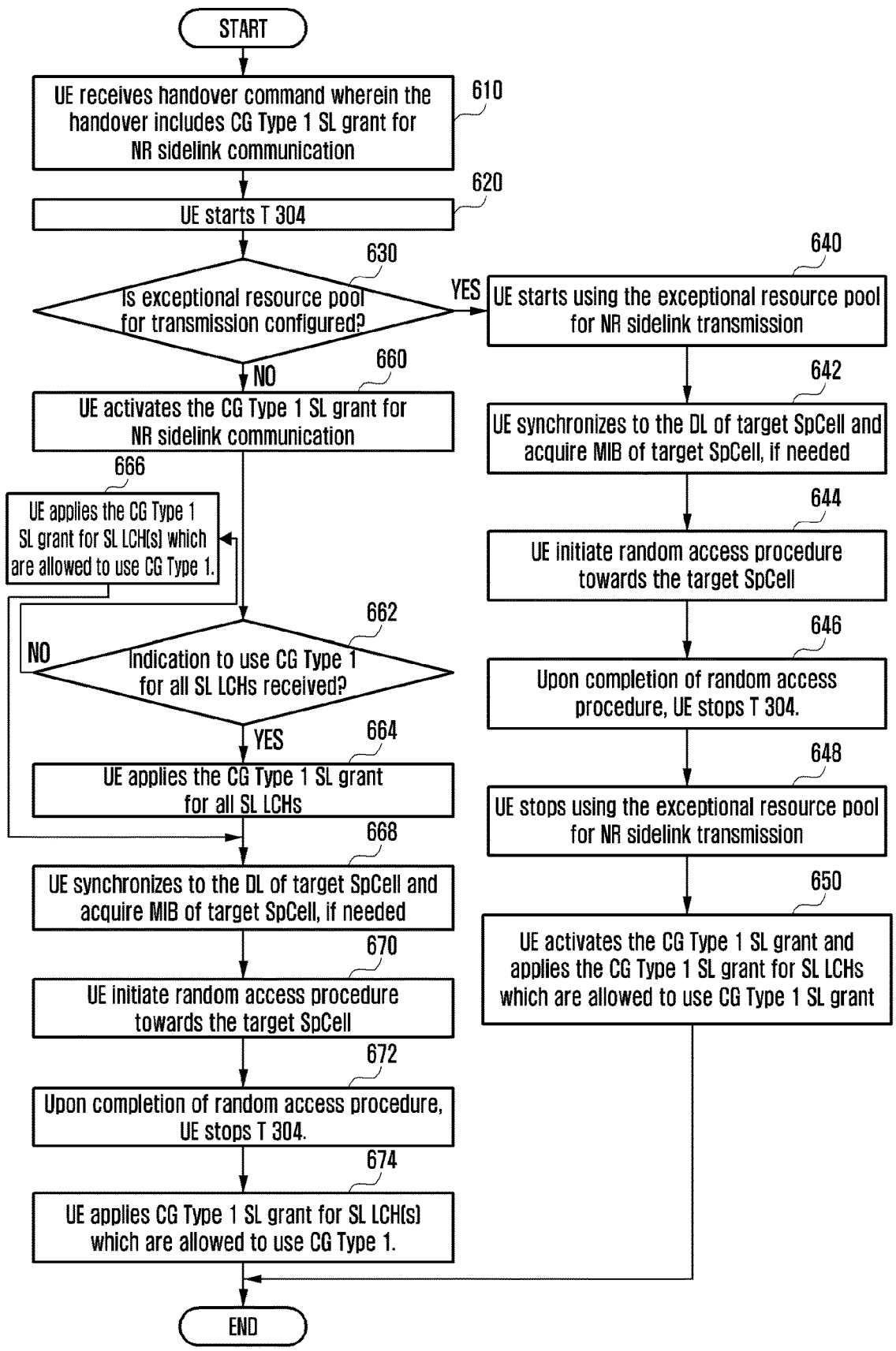
FIG. 6 illustrates an operation of a UE for handling CG Type 1 grant during handover according to another embodiment based on Method 3 of the disclosure.

FIG. 6 illustrates an operation of a UE for handling CG Type 1 grant during handover according to another embodiment based on Method 3 of the disclosure.

Referring to FIG. 6, UE receives handover command at operation 610. The handover command includes CG type 1 SL grant for NR SL communication. UE starts a timer T 304 at operation 620. Upon receiving the handover command or RRC reconfiguration message including reconfigurationWithSync: UE identifies whether exceptional resource pool for transmission is configured at operation 630.

If exceptional resource pool for transmission is configured, UE starts using the exceptional resource pool for NR SL transmission 640. UE synchronizes to the DL of target SpCell and acquires MIB of target SpCell, if needed, at operation 642. UE initiates RA procedure towards the target SpCell at operation 644. Upon completion of RA procedure, UE stops the timer T 304 at operation 646. UE stops using the exceptional resource pool for NR SL transmission at operation 648. UE activates the CG Type 1 SL grant and applies the CG Type 1 SL grant for SL LCHs which are allowed to use CG Type 1 SL grant at operation 650.

If exceptional resource pool for transmission is not configured, UE activates the CG Type 1 SL grant for NR SL communication at operation 660.

In an alternate embodiment of this method of disclosure, network may indicate whether UE is allowed to use CG Type 1 for all SL LCHs or only the indicated SL LCHs during handover. Presence of new parameter (UseCGType1forAllSLLCHs) in RRC reconfiguration message can indicate that UE can use CG Type 1 for all SL LCHs during handover. The new parameter (UseCGType1forAllSLLCHs) in RRC reconfiguration message may be set to TRUE to indicate that UE can use CG Type 1 for all SL LCHs during handover.

UE identifies whether indication to use CG Type 1 for all SL LCHs is received at operation 662. If the indication is received, UE applies the CG Type 1 SL grant for all SL LCHs at operation 664. Otherwise, UE applies the CG Type 1 SL grant for SL LCH(s) which are allowed to use CG Type 1 at operation 666. UE synchronizes to the DL of target SpCell and acquires MIB of target SpCell, if needed, at operation 668. UE initiates RA procedure towards the target SpCell at operation 670. Upon completion of RA procedure, UE stops the timer T 304 at operation 390. UE applies the CG Type 1 SL grant for SL LCH(s) which are allowed to use CG type 1 at operation 400.

SL Channel Quality Indicator (CQI)/Rank Indicator (RI) Reporting for NR SL Communication In case of NR SL unicast communication, for SL CQI/RI reporting, SL CQI/RI report media access control (MAC) control element (CE) is transmitted from reception (RX) UE to transmission (TX) UE. Physical layer (L1) in RX UE indicates MAC layer to transmit SL CQI/RI report. MAC layer in RX UE initiates transmission of SL CQI/RI report MAC CE. If RX UE is configured with scheduled resource allocation (i.e., mode 1) and there is no configured SL-resource available: MAC layer in RX UE triggers scheduling request (SR) wherein SR configuration to be used for SL CQI/RI report MAC CE is configured by network via RRC signaling. Since this SR is dedicated for SL MAC CE, upon receiving this SR, network (i.e., gNB) schedules SL grant to RX UE. RX UE transmits SL CQI/RI report MAC CE in SL grant. If RX UE is configured with scheduled resource allocation (i.e., mode 1) and if there is configured SL-resource available, UE does not trigger SR.

Issue 1: if UE has configured SL-resource available, UE does not trigger SR. The assumption is that SL CQI/RI report MAC CE can be transmitted to TX UE using the configured SL-resource. However, it is possible that SL CQI/RI report MAC CE may not be transmitted in available SL resource due to logical channel prioritization. So, condition to trigger SR for SL CQI/RI reporting needs to be enhanced. It is also possible that the SL transmission in available SL resource may overlap with uplink (UL) and SL transmission may be dropped due to prioritization rule as defined in technical specification (TS) 38.321 for SL and UL prioritization.

Figure 7:
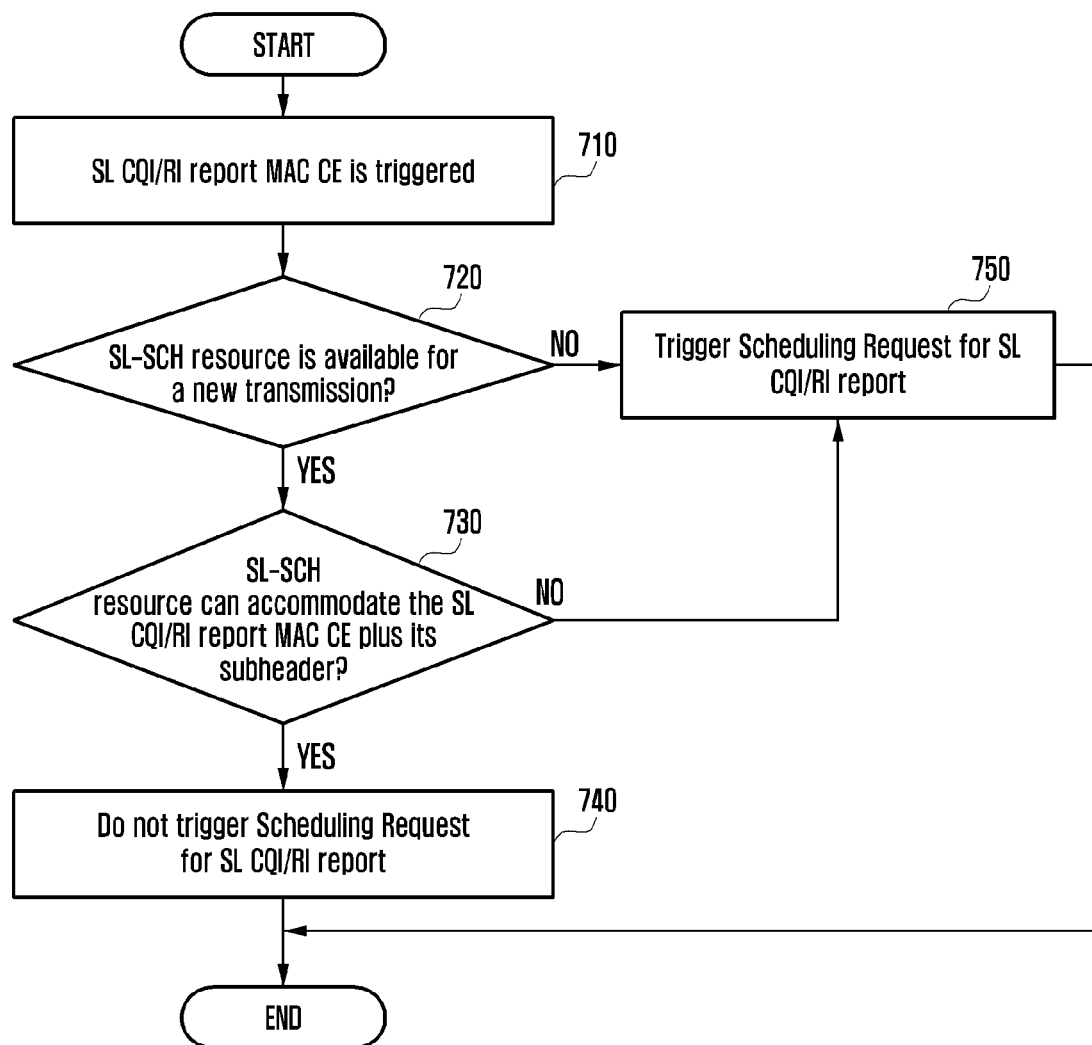
FIG. 7 illustrates an operation of a UE for sidelink (SL) channel quality indicator (CQI)/rank indicator (RI) reporting for new radio (NR) SL communication according to an embodiment based on Method 1 of the disclosure.

Method 1:

FIG. 7 illustrates an operation of a UE for SL CQI/RI reporting for NR SL communication according to an embodiment based on Method 1 of the disclosure.

In one method of this disclosure, it is proposed that if scheduled resource allocation is configured for NR SL communication and SL CQI/RI reporting is triggered and SR configuration to be used for SL CQI/RI reporting is configured by network via RRC signaling, UE determines whether to trigger SR for SL CQI/RI report as follows.

Referring to FIG. 7, SL CQI/RI report MAC CE is triggered at operation 710. UE identifies whether SL shared channel (SL-SCH) resource is available for a new transmission at operation 720. If SL-SCH resource is available for a new transmission, UE identifies whether SL-SCH resource can accommodate the SL CQI/RI report MAC CE plus its subheader as a result of LCP (where LCP is defined in TS 38.321 for NR SL communication) at operation 730. If SL-SCH resource can accommodate the SL CQI/RI report MAC CE plus its subheader: UE does not trigger an SR for SL CQI/RI report at operation 740. Otherwise, UE triggers an SR for SL CQI/RI report at operation 750.

(Alternate) If SL-SCH resource is available for a new transmission within a timer interval T and this SL-SCH resource can accommodate the SL CQI/RI report MAC CE plus its subheader as a result of LCP (where LCP is defined in TS 38.321 for NR SL communication): UE does not trigger an SR for SL CQI/RI report. Otherwise, UE triggers an SR for SL CQI/RI report.

Time interval T is configurable via RRC signaling and starts when SL CQI/RI report is triggered.

Figure 8:
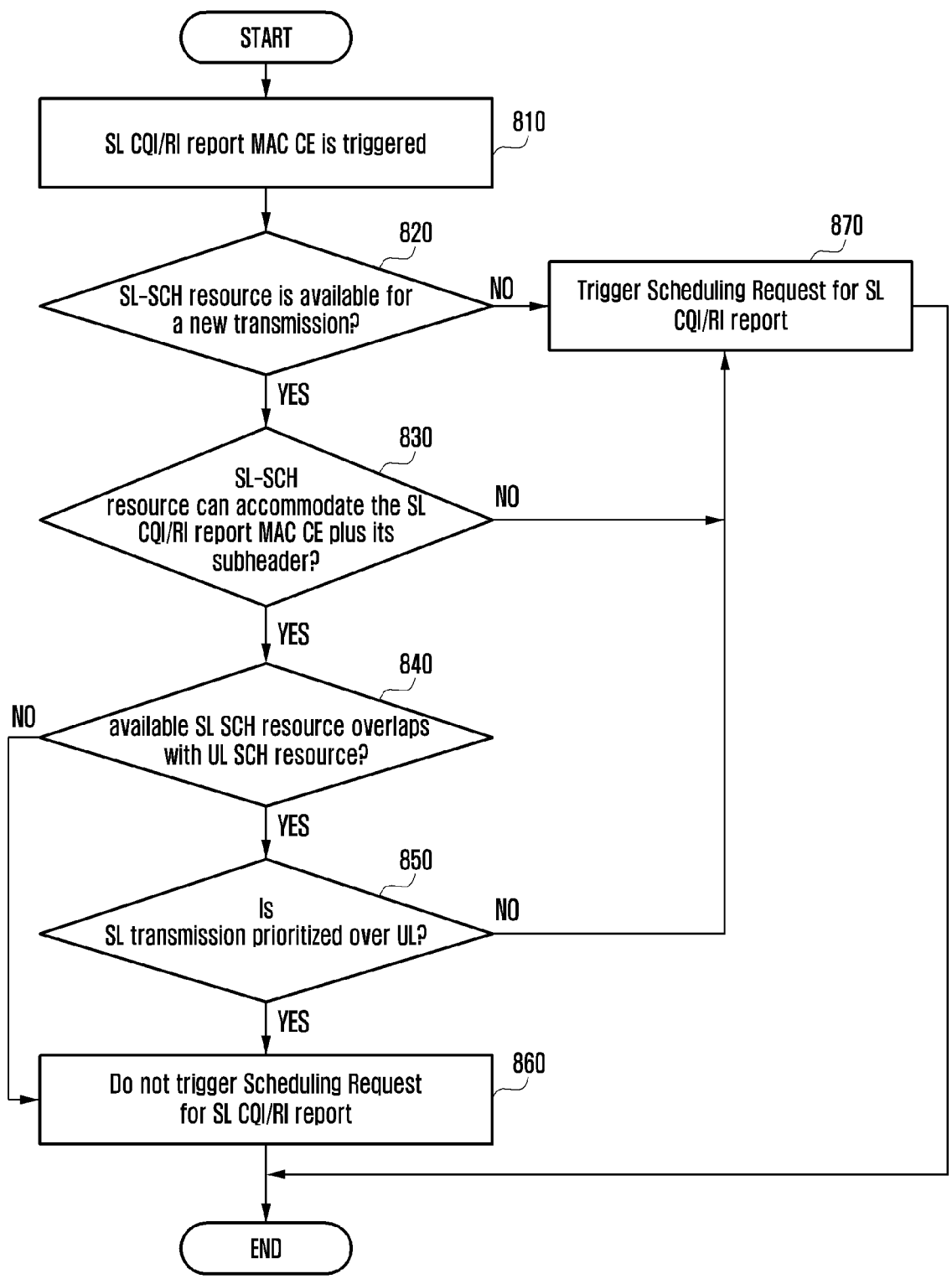
FIG. 8 illustrates an operation of a UE for SL CQI/RI reporting for NR SL communication according to an embodiment based on Method 2 of the disclosure.

Method 2:

FIG. 8 illustrates an operation of a UE for SL CQI/RI reporting for NR SL communication according to an embodiment based on Method 2 of the disclosure.

In another method of this disclosure, it is proposed that if scheduled resource allocation is configured for NR SL communication and SL CQI/RI reporting is triggered and SR configuration to be used for SL CQI/RI reporting is configured by network via RRC signaling, UE determines whether to trigger SR for SL CQI/RI report as follows.

Referring to FIG. 8, SL CQI/RI report MAC CE is triggered at operation 810. UE identifies whether SL-SCH resource is available for a new transmission at operation 820. If SL-SCH resource is available for a new transmission, UE identifies whether SL-SCH resource can accommodate the SL CQI/RI report MAC CE plus its subheader as a result of LCP (where LCP is defined in TS 38.321 for NR SL communication) at operation 830. If SL-SCH resource can accommodate the SL CQI/RI report MAC CE plus its subheader, UE identifies whether available SL-SCH resource overlaps with UL SCH resource at operation 840. If available SL-SCH resource overlaps with UL SCH resource, UE identifies whether SL transmission is prioritized over UL at operation 850. If available SL-SCH resource does not overlap with UL SCH resource or SL transmission is prioritized over UL, i.e., SL transmission in this available SL-SCH resource is not dropped due to prioritization between SL and UL (where prioritization between SL and UL prioritization is defined in TS 38.321 for NR SL communication): UE does not trigger an SR for SL CQI/RI report at operation 860. Otherwise, UE triggers an SR for SL CQI/RI report at operation 870.

(Alternate) If SL-SCH resource is available for a new transmission within a timer interval T and SL-SCH resource can accommodate the SL CQI/RI report MAC CE plus its subheader as a result of LCP (where LCP is defined in TS 38.321 for NR SL communication) and SL transmission in this available SL-SCH resource is not dropped due to prioritization between SL and UL (where prioritization between SL and UL prioritization is defined in TS 38.321 for NR SL communication): UE does not trigger an SR for SL CQI/RI report. Otherwise, UE triggers an SR for SL CQI/RI report.

Time interval T is configurable via RRC signaling and starts when SL CQI/RI report is triggered.

Figure 9:
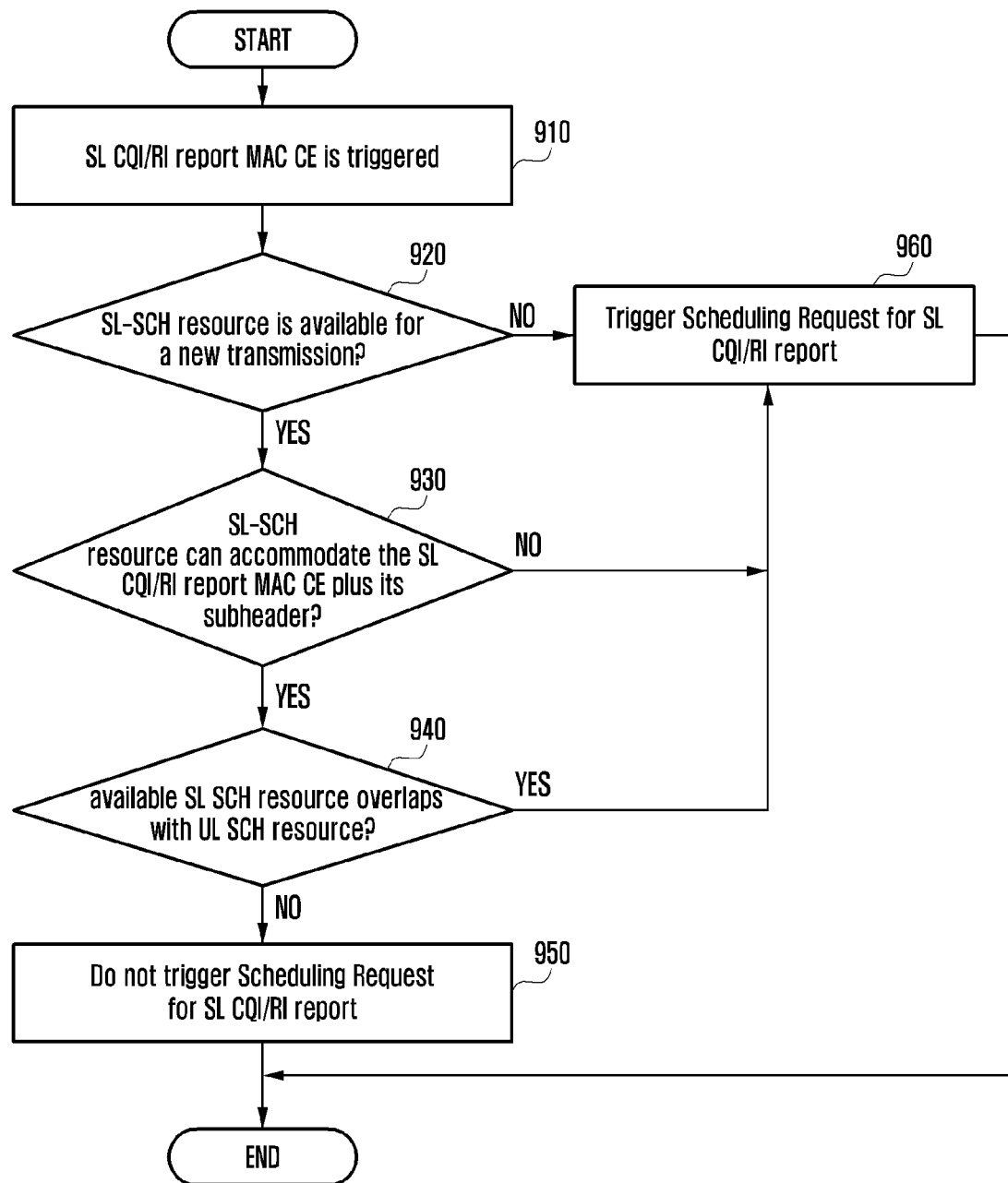
FIG. 9 illustrates an operation of a UE for SL CQI/RI reporting for NR SL communication according to an embodiment based on Method 3 of the disclosure.

Method 3:

FIG. 9 illustrates an operation of a UE for SL CQI/RI reporting for NR SL communication according to an embodiment based on Method 3 of the disclosure.

In another method of this disclosure, it is proposed that if scheduled resource allocation is configured for NR SL communication and SL CQI/RI reporting is triggered and SR configuration to be used for SL CQI/RI reporting is configured by network via RRC signaling, UE determines whether to trigger SR for SL CQI/RI report as follows.

Referring to FIG. 9, SL CQI/RI report MAC CE is triggered at operation 910. UE identifies whether SL-SCH resource is available for a new transmission at operation 920. If SL-SCH resource is available for a new transmission, UE identifies whether SL-SCH resource can accommodate the SL CQI/RI report MAC CE plus its subheader as a result of LCP (where LCP is defined in TS 38.321 for NR SL communication) at operation 930. If SL-SCH resource can accommodate the SL CQI/RI report MAC CE plus its subheader, UE identifies whether available SL-SCH resource overlaps with UL SCH resource in time at operation 940. If available SL-SCH resource is not overlapping with UL-SCH resource: UE does not trigger an SR for SL CQI/RI report at operation 950. Otherwise, UE triggers an SR for SL CQI/RI report at operation 960.

(Alternate) If SL-SCH resource is available for a new transmission within a timer interval T and SL-SCH resource can accommodate the SL CQI/RI report MAC CE plus its subheader as a result of LCP (where LCP is defined in TS 38.321 for NR SL communication) and available SL-SCH resource is not overlapping with UL-SCH resource in time: UE does not trigger an SR for SL CQI/RI report. Otherwise, UE triggers an SR for SL CQI/RI report.

Time interval T is configurable via RRC signaling and starts when SL CQI/RI report is triggered.

Figure 10:
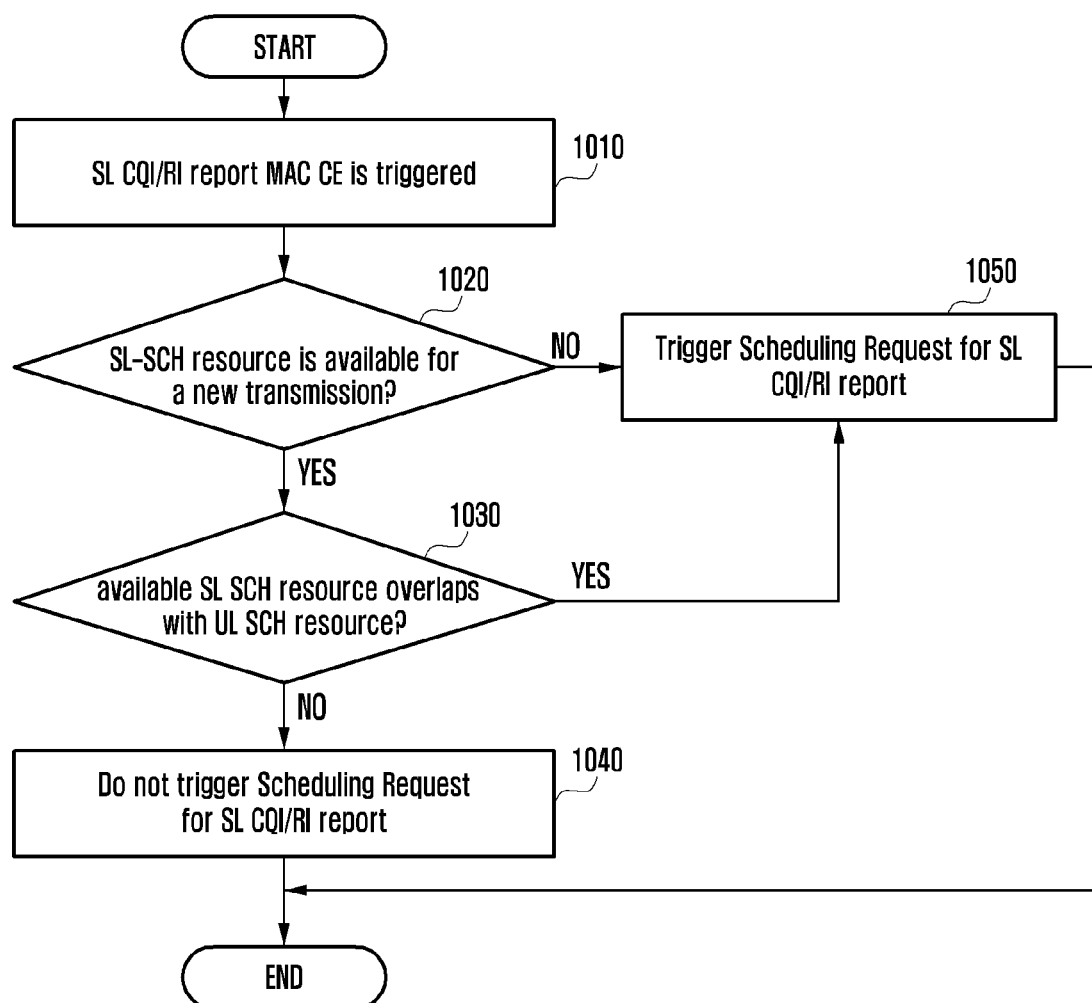
FIG. 10 illustrates an operation of a UE for SL CQI/RI reporting for NR SL communication according to an embodiment based on Method 4 of the disclosure.

Method 4:

FIG. 10 illustrates an operation of a UE for SL CQI/RI reporting for NR SL communication according to an embodiment based on Method 4 of the disclosure.

In another method of this disclosure, it is proposed that if scheduled resource allocation is configured for NR SL communication and SL CQI/RI reporting is triggered and SR configuration to be used for SL CQI/RI reporting is configured by network via RRC signaling, UE determines whether to trigger SR for SL CQI/RI report as follows.

Referring to FIG. 10, SL CQI/RI report MAC CE is triggered at operation 1010. UE identifies whether SL-SCH resource is available for a new transmission at operation 1020. If SL-SCH resource is available for a new transmission, UE identifies whether available SL-SCH resource overlaps with UL SCH resource in time at operation 1030. If available SL-SCH resource is not overlapping with UL-SCH resource: UE does not trigger an SR for SL CQI/RI report at operation 1040. Otherwise, UE triggers an SR for SL CQI/RI report at operation 1050.

(Alternate) If SL-SCH resource is available for a new transmission within a time interval T and available SL-SCH resource is not overlapping with UL-SCH resource in time: UE does not trigger an SR for SL CQI/RI report. Otherwise, UE triggers an SR for SL CQI/RI report.

Time interval T is configurable via RRC signaling and starts when SL CQI/RI report is triggered.

In the methods (1 to 4) explained above, upon triggering of SL CQI/RI reporting for a unicast connection, MAC layer starts a timer. The value of timer is configured by network (e.g., gNB) via RRC signaling, i.e., RRC configures the value of timer to control the SL-CSI reporting procedure, which is maintained for each PC5-RRC connection. The timer is used for a SL-CSI reporting UE to follow the latency requirement signaled from a CSI triggering UE. The value of the timer is the same as the latency requirement of the SL-CSI reporting configured by RRC. The timer is stopped upon transmitting the SL CQI/RI reporting MAC CE. If the timer expires, MAC layer in RX UE cancels the triggered SL CQI/RI reporting and cancels the pending SR for the same. Note that if there are multiple unicast connections, RX UE maintains separate timer for each of them, i.e., the timer is maintained for each pair of the Source Layer-2 ID and the Destination Layer-2 ID corresponding to a PC5-RRC connection.

In the methods (1 to 4) explained above, upon triggering of SR for SL CQI/RI reporting, if UE fails to receive SL grant and SR failure is declared (after transmitting SR configured number of times), UE may trigger RA procedure, and transmit SL buffer status report (BSR) for SL CQI/RI report during the RA procedure.

In the methods (1 to 4) explained above, upon triggering of SR for SL CQI/RI reporting, if UE fails to receive SL grant and SR failure is declared (after transmitting SR configured number of times), UE may trigger RA procedure, and trigger SL BSR for SL CQI/RI report. This SL BSR for SL CQI/RI report can be transmitted during RA procedure (e.g., in message A (MSGA) of 2-step RA procedure or message 3 (Msg3) of 4-step RA procedure), and network can allocate SL grant upon receiving SL BSR for SL CQI/RI report.

Issue 2: SR configuration for SL CQI/RI reporting may not be configured by gNB to RX UE. In this case, upon triggering SR for SL CQI/RI report MAC CE, as SR resource is not available, MAC entity triggers RA. However, from RA, gNB cannot identify that UE needs SL resources. Some mechanism to request SL resources for SL CQI/RI reporting is needed if SR configuration is not configured for SL CQI/RI reporting.

In one embodiment of this disclosure, if SR configuration is not configured for SL CQI/RI report, SL BSR for SL CQI/RI report can be triggered.

In another embodiment of this disclosure: if SR configuration is configured for SL CQI/RI report or if SL-SCH resource is available for a new transmission and SL-SCH resource can accommodate the SL CQI/RI report MAC CE plus its subheader as a result of LCP: UE does not trigger an SL BSR for SL CQI/RI report. Otherwise, UE triggers an SL BSR for SL CQI/RI report.

In another embodiment of this disclosure: if SR configuration is configured for SL CQI/RI report or if SL-SCH resource is available for a new transmission and SL-SCH resource can accommodate the SL CQI/RI report MAC CE plus its subheader as a result of LCP and SL transmission in this available SL-SCH resource is not dropped due to prioritization between SL and UL (where prioritization between SL and UL prioritization is defined in TS 38.321 for NR SL communication): UE does not trigger an SL BSR for SL CQI/RI report. Otherwise, UE triggers an SL BSR for SL CQI/RI report.

In another embodiment of this disclosure: if SR configuration is configured for SL CQI/RI report or if SL-SCH resource is available for a new transmission and SL-SCH resource can accommodate the SL CQI/RI report MAC CE plus its subheader as a result of LCP and SL transmission in this available SL-SCH resource is not overlapping with UL SCH resources in time: UE does not trigger an SL BSR for SL CQI/RI report. Otherwise, UE triggers an SL BSR for SL CQI/RI report.

In another embodiment of this disclosure: if SR configuration is configured for SL CQI/RI report or if SL-SCH resource is available for a new transmission and SL transmission in this available SL-SCH resource is not overlapping with UL SCH resources in time: UE does not trigger an SL BSR for SL CQI/RI report. Otherwise, UE triggers an SL BSR for SL CQI/RI report.

SL BSR MAC CE for requesting resources for SL LCHs is used to indicate buffer size in SL groups of LCHs (LCGs) of one or more destinations. In order to enable gNB to identify that the SL BSR MAC CE is for requesting resources for SL CQI/RI report, some enhancements are needed.

Option 1: LCH identifier (LCID) in MAC subheader for SL BSR for SL CQI/RI report is different from LCID in MAC subheader for normal SL BSR. So, based on LCID, gNB can identify whether SL BSR is for SL CQI/RI report or not.

Figure 11:
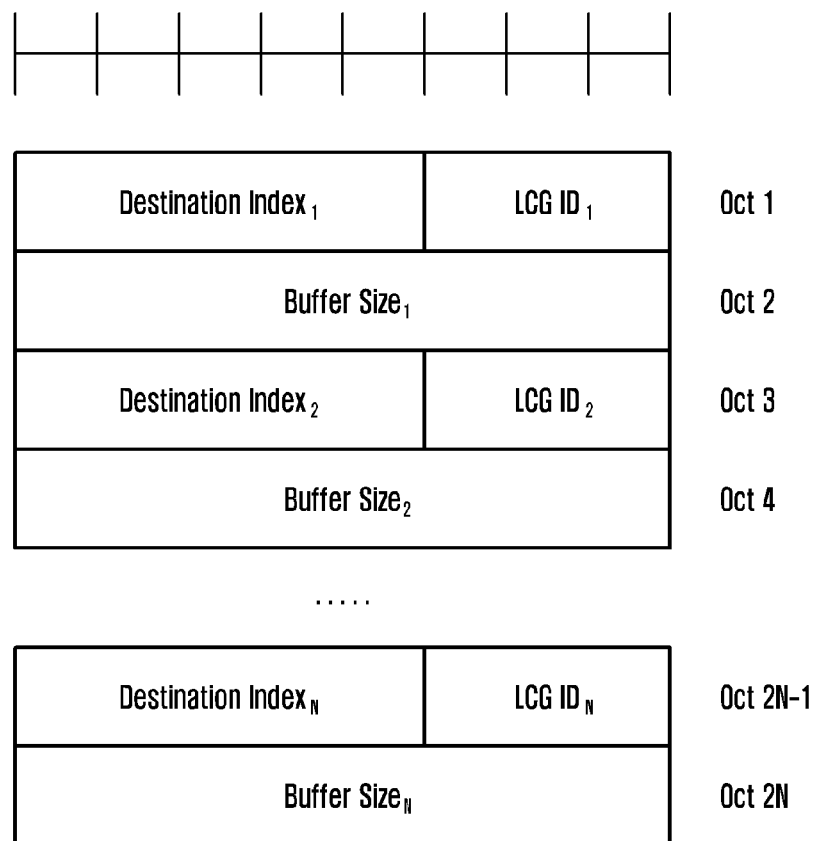
FIG. 11 illustrates a media access control (MAC) control element (CE) format of SL buffer status report (BSR) according to an embodiment of the disclosure.

FIG. 11 illustrates an MAC CE format of SL BSR according to an embodiment of the disclosure.

MAC CE format of SL BSR for SL CQI/RI report is same as SL BSR MAC CE. It includes destination index, LCG ID and buffer size. Destination index in SL BSR for SL CQI/RI report is set to index of destination for which SL CQI/RI report is intended. LCG field in SL BSR for SL CQI/RI report is ignored by gNB. UE can set it to zero or pre-defined value. Buffer size in SL BSR for SL CQI/RI report is ignored by gNB as size of SL CQI/RI report is fixed. Buffer size field can be removed in an alternate embodiment.

Option 2: LCID in MAC subheader for normal SL BSR and LCID in MAC subheader for SL BSR for SL CQI/RI report are same. BSR MAC CE format for SL CQI/RI report is same as SL BSR MAC CE. It includes destination index, LCG ID and buffer size. Destination index in SL BSR for SL CQI/RI report is set to index of destination for which SL CQI/RI report is intended. LCG field in SL BSR for SL CQI/RI report is set to a pre-defined LCG ID. Buffer size in SL BSR for SL CQI/RI report is ignored by gNB as size of SL CQI/RI report is fixed. Buffer size field can be removed in an alternate embodiment.

In an alternate embodiment of option 1/2, destination index field in SL BSR for SL CQI/RI report can be ignored by gNB. UE can set it to zeros or pre-defined value. In an alternate embodiment, destination index field may not be included in SL BSR for SL CQI/RI report. In an alternate embodiment, destination index field and buffer size may not be included in SL BSR for SL CQI/RI report.

Issue 3: According to current procedure, for SL transmission in SL grant, UE select destination as follows: Among the LCH having data available for transmission, UE selects the destination corresponding to the LCH with highest priority.

Alternately, UE selects the destination L2 ID with highest priority LCH having Bj>0 among the LCHs having data available for transmission. If there are no LCHs with Bj>0, the UE selects the destination L2 ID having the LCH with highest priority among the LCHs having data available for transmission. Parameter Bj is maintained for every SL LCH as specified in TS 38.321.

The issue in the above procedure is that SL MAC CE is not considered for destination selection. In the existing procedure, only SL SCH service data unit (SDU) is included in MAC protocol data unit (PDU). It is possible that SL MAC CE may have higher priority than highest priority LCH having Bj>0 among the LCHs having data available for transmission, or if there are no LCHs with Bj>0, SL MAC CE may have higher priority than highest priority LCH having data available for transmission, or there may not be any LCH having data available for transmission. In all cases listed above, destination is incorrectly selected and transmission of SL MAC CE may be delayed.

Proposed LCP Procedure Considering SL MAC CE:

Method 1:

1. Destination Selection

UE identifies whether SL MAC CE is available for transmission.

If SL MAC CE is available for transmission: UE identifies whether there are SL LCH(s) with Bj>0 among the SL LCHs having data available for transmission or there are no SL LCHs having data available for transmission.

If there are SL LCH(s) with Bj>0 among the SL LCHs having data available for transmission: UE identifies whether SL MAC CE has higher priority than the highest priority SL LCH having Bj>0 among the SL LCHs having data available for transmission. If SL MAC CE has higher priority than the highest priority SL LCH having Bj>0 among the SL LCHs having data available for transmission, UE selects destination (or destination L2 ID) of SL MAC CE. Otherwise, UE selects the destination (or destination L2 ID) with highest priority SL LCH having Bj>0.

If there are no SL LCHs with Bj>0 among the SL LCHs having data available for transmission: UE identifies whether SL MAC CE has higher priority than the highest priority SL LCH among the SL LCHs having data available for transmission. If SL MAC CE has higher priority than the highest priority SL LCH among the SL LCHs having data available for transmission, UE selects destination (or destination L2 ID) of SL MAC CE. Otherwise, UE selects the destination (or destination L2 ID) with highest priority LCH.

If there are no SL LCHs having data available for transmission, UE selects destination (or destination L2 ID) of SL MAC CE.

Else (i.e., if SL MAC CE is not available for transmission): UE identifies whether there are SL LCH(s) with Bj>0 among the SL LCHs having data available for transmission.

If there are SL LCH(s) with Bj>0 among the SL LCHs having data available for transmission: UE selects the destination (or destination L2 ID) with highest priority SL LCH having Bj>0 among the SL LCHs having data available for transmission.

If there are no SL LCHs with Bj>0 among the SL LCHs having data available for transmission: UE selects the destination (or destination L2 ID) having the SL LCH with highest priority among the SL LCHs having data available for transmission.

2. UE allocates resources to SL MAC CE of selected destination and 'SL LCHs with Bj>0 among the SL LCHs of selected destination having data available for transmission' in decreasing priority, where SL LCHs are allocated resources up to Bj.

3. If any resources remain, all SL MAC CE available for transmission for the selected destination and all the LCHs of selected destination, having data available for transmission are served in a strict decreasing priority order (regardless of the value of Bj) until either the data for that LCH or the SL grant is exhausted, whichever comes first. LCHs configured with equal priority should be served equally (or up to UE implementation).

Method 2:

1. Destination Selection

UE identifies whether SL MAC CE is available for transmission.

If SL MAC CE is available for transmission: UE identifies whether there are SL LCH(s) with Bj>0 among the SL LCHs having data available for transmission or there are no SL LCHs having data available for transmission.

If there are SL LCH(s) with Bj>0 among the SL LCHs having data available for transmission: UE identifies whether the highest priority SL MAC CE available for transmission has higher priority than the highest priority SL LCH having Bj>0 among the SL LCHs having data available for transmission. If the highest priority SL MAC CE available for transmission has higher priority than the highest priority SL LCH having Bj>0 among the SL LCHs having data available for transmission, UE selects destination (or destination L2 ID) of highest priority SL MAC CE available for transmission. If highest priority SL MAC CE is available for transmission for multiple destinations, selection of destination is up to UE implementation, or UE selects the destination corresponding to SL MAC CE which was triggered earlier. Otherwise, UE selects the destination (or destination L2 ID) of highest priority SL LCH having Bj>0.

If there are no SL LCHs with Bj>0 among the SL LCHs having data available for transmission: UE identifies whether the highest priority SL MAC CE available for transmission has higher priority than the highest priority SL LCH among the SL LCHs having data available for transmission. If the highest priority SL MAC CE available for transmission has higher priority than the highest priority SL LCH among the SL LCHs having data available for transmission, UE selects destination (or destination L2 ID) of highest priority SL MAC CE available for transmission. If highest priority SL MAC CE is available for transmission for multiple destinations, selection of destination is up to UE implementation, or UE selects the destination corresponding to SL MAC CE which was triggered earlier. Otherwise, UE selects the destination (or destination L2 ID) with highest priority LCH.

If there are no SL LCHs having data available for transmission, UE selects destination (or destination L2 ID) of SL MAC CE.

Else (i.e., if SL MAC CE is not available for transmission): UE identifies whether there are SL LCH(s) with Bj>0 among the SL LCHs having data available for transmission.

If there are SL LCH(s) with Bj>0 among the SL LCHs having data available for transmission: UE selects the destination (or destination L2 ID) with highest priority SL LCH having Bj>0 among the SL LCHs having data available for transmission.

If there are no SL LCHs with Bj>0 among the SL LCHs having data available for transmission: UE selects the destination (or destination L2 ID) having the SL LCH with highest priority among the SL LCHs having data available for transmission.

2. UE allocates resources to SL MAC CE(s) of selected destination and 'SL LCHs with Bj>0 among the SL LCHs of selected destination having data available for transmission' in decreasing priority, where SL LCHs are allocated resources up to Bj.

3. If any resources remain, all SL MAC CE available for transmission for the selected destination and all the LCHs of selected destination, having data available for transmission are served in a strict decreasing priority order (regardless of the value of Bj) until either the data for that LCH or the SL grant is exhausted, whichever comes first. LCHs configured with equal priority should be served equally (or up to UE implementation).

Method 3:

1. Destination Selection

UE identifies whether SL MAC CE is available for transmission.

If SL MAC CE is available for transmission: UE selects destination (or destination L2 ID) of highest priority SL MAC CE available for transmission.

Else, UE identifies there are SL LCH(s) with Bj>0 among the SL LCHs having data available for transmission. If there are SL LCH(s) with Bj>0 among the SL LCHs having data available for transmission: UE selects the destination (or destination L2 ID) with highest priority SL LCH having Bj>0 among the SL LCHs having data available for transmission. If there are no SL LCHs with Bj>0 among the SL LCHs having data available for transmission: UE selects the destination (or destination L2 ID) having the SL LCH with highest priority among the SL LCHs having data available for transmission.

2. UE allocates resources to SL MAC CE of selected destination in decreasing priority order.

3. If any resources remain, SL LCHs with Bj>0 among the SL LCHs of selected destination having data available for transmission are served in decreasing priority up to Bj.

4. If any resources remain, all the LCHs of selected destination, having data available for transmission are served in a strict decreasing priority order (regardless of the value of Bj) until either the data for that LCH or the SL grant is exhausted, whichever comes first. LCHs configured with equal priority should be served equally (or up to UE implementation).

Method 4:

1. Destination Selection

UE identifies whether SL MAC CE is available for transmission.

If SL MAC CE is available for transmission: UE selects destination (or destination L2 ID) of highest priority SL MAC CE available for transmission. Else, UE identifies whether there are SL LCH(s) with Bj>0 among the SL LCHs having data available for transmission. If there are SL LCH(s) with Bj>0 among the SL LCHs having data available for transmission: UE selects the destination (or destination L2 ID) with highest priority SL LCH having Bj>0 among the SL LCHs having data available for transmission.

If there are no SL LCHs with Bj>0 among the SL LCHs having data available for transmission: UE selects the destination (or destination L2 ID) having the SL LCH with highest priority among the SL LCHs having data available for transmission.

2. UE allocates resources to SL MAC CE of selected destination and 'SL LCHs with Bj>0 among the SL LCHs of selected destination having data available for transmission' in decreasing priority, where SL LCHs are allocated resources up to Bj.

3. If any resources remain, all SL MAC CE available for transmission for the selected destination and all the LCHs of selected destination, having data available for transmission are served in a strict decreasing priority order (regardless of the value of Bj) until either the data for that LCH or the SL grant is exhausted, whichever comes first. LCHs configured with equal priority should be served equally (or up to UE implementation).

In the methods explained above, SL MAC CE used for destination selection can be any SL MAC CE. In an embodiment, in the methods explained above, SL MAC CE(s) used for destination selection can be pre-defined. In the methods explained above, SL MAC CE(s) used for destination selection can be SL MAC CE for CQI/RI reporting.

4. UE allocates resources to SL MAC CE of selected destination and 'SL LCHs with Bj>0 among the SL LCHs of selected destination having data available for transmission' in decreasing priority, where SL LCHs are allocated resources up to Bj.

5. If any resources remain, all SL MAC CE available for transmission for the selected destination and all the LCHs of selected destination, having data available for transmission are served in a strict decreasing priority order (regardless of the value of Bj) until either the data for that LCH or the SL grant is exhausted, whichever comes first. LCHs configured with equal priority should be served equally (or up to UE implementation).

Figure 12:
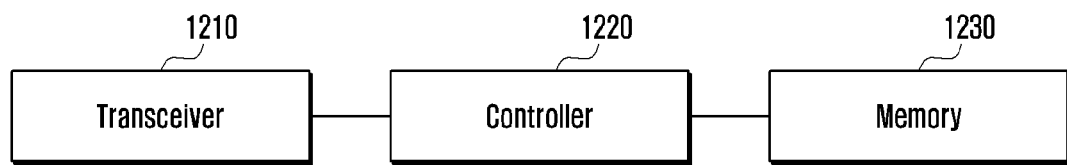
FIG. 12 is a block diagram of a terminal according to an embodiment of the disclosure.

FIG. 12 is a block diagram of a terminal according to an embodiment of the disclosure.

Referring to FIG. 12, a terminal includes a transceiver 1210, a controller 1220 and a memory 1230. The controller 1220 may refer to a circuitry, an ASIC, an FPGA, or at least one processor. The transceiver 1210, the controller 1220 and the memory 1230 are configured to perform the operations of the UE illustrated in the figures, e.g., FIGS. 1 to 10, or as otherwise described above. Although the transceiver 1210, the controller 1220 and the memory 1230 are shown as separate entities, they may be integrated onto a single chip. The transceiver 1210, the controller 1220 and the memory 1230 may also be electrically connected to or coupled with each other.

The transceiver 1210 may transmit and receive signals to and from other network entities, e.g., a base station.

The controller 1220 may control the UE to perform functions according to the embodiments described above. For example, the controller 1220 identifies that the SL-CSI reporting has been triggered. If a timer for SL-CSI reporting for the triggered SL-CSI reporting is not running, the controller 1220 starts the timer. if the timer for the triggered SL-CSI reporting expires, the controller 1220 cancels the triggered SL-CSI reporting. If the MAC entity has SL resources allocated for new transmission and the SL resources can accommodate the SL-CSI reporting MAC CE and its subheader as a result of logical channel prioritization, the controller 1220 stops the timer for the triggered SL-CSI reporting and cancels the triggered SL-CSI reporting. Else if the MAC entity has been configured with the SL resource allocation mode 1, the controller 1220 triggers an SR. In another embodiment, the contoller 1220 selects a destination, having at least one of the MAC CE and the LCH with the highest priority among the LCHs and MAC CE(s).

In an embodiment, the operations of the terminal may be implemented using the memory 1230 storing corresponding program codes. Specifically, the terminal may be equipped with the memory 1230 to store program codes implementing desired operations. To perform the desired operations, the controller 1220 may read and execute the program codes stored in the memory 1230 by using a processor or a central processing unit (CPU).

Figure 13:
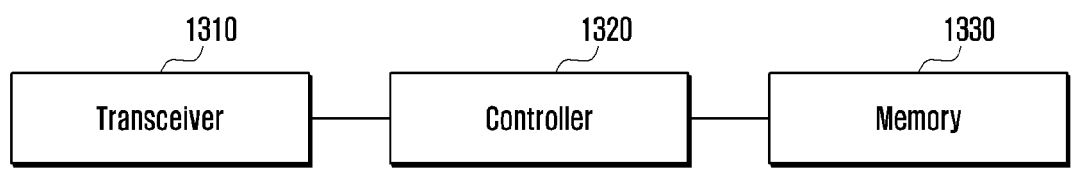
FIG. 13 is a block diagram of a base station according to an embodiment of the disclosure.

FIG. 13 is a block diagram of a base station according to an embodiment of the disclosure.

Referring to FIG. 13, a base station includes a transceiver 1310, a controller 1320 and a memory 1330. The controller 1320 may refer to a circuitry, an ASIC, an FPGA, or at least one processor. The transceiver 1310, the controller 1320 and the memory 1330 are configured to perform the operations of the gNB (or network) illustrated in the figures, or as otherwise described above. Although the transceiver 1310, the controller 1320 and the memory 1330 are shown as separate entities, they may be integrated onto a single chip. The transceiver 1310, the controller 1320 and the memory 1330 may also be electrically connected to or coupled with each other.

The transceiver 1310 may transmit and receive signals to and from other network entities, e.g., a terminal.

The controller 1320 may control the gNB to perform functions according to the embodiments of the disclosure. In an embodiment, the operations of the base station may be implemented using the memory 1330 storing corresponding program codes. Specifically, the base station may be equipped with the memory 1330 to store program codes implementing desired operations. To perform the desired operations, the controller 1320 may read and execute the program codes stored in the memory 1330 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    identifying whether sidelink (SL) resources are allocated for new transmission, in case that sidelink channel state information (SL-CSI) reporting is triggered;
    in case that the SL resources are allocated for the new transmission, identifying whether the SL resources can accommodate a media access control (MAC) control element (CE) and a subheader for the SL-CSI reporting based on a result of a logical channel prioritization; and
    triggering a scheduling request for the SL-CSI reporting in case that the SL resources cannot accommodate the MAC CE and the subheader for the SL-CSI reporting.

2. The method of claim 1, further comprising:
    in case that the SL resources are not allocated for the new transmission, triggering the scheduling request.

3. The method of claim 1, further comprising:
    in case that the SL resources can accommodate the MAC CE and the subheader for the SL-CSI reporting, determining to not trigger the scheduling request for the SL-CSI reporting.

4. The method of claim 1, further comprising:
    starting a timer based on triggering the SL-CSI reporting.

5. The method of claim 4, further comprising:
    receiving, from a base station, configuration information on a value of the timer.

6. The method of claim 4, further comprising:
    stopping the timer for the triggered SL-CSI reporting based on transmitting a MAC CE for the SL-CSI reporting.

7. The method of claim 4, further comprising:
    upon expiry of the timer for the triggered SL-CSI reporting, cancelling the triggered SL-CSI reporting.

8. The method of claim 4, wherein the timer is maintained for each pair of a source layer-2 identifier and a destination layer-2 identifier corresponding to PC5-radio resource control (RRC) connection.

9. A terminal in a wireless communication system, the terminal comprising:
    a transceiver; and
    a controller coupled with the transceiver and configured to:
        identify whether sidelink (SL) resources are allocated for new transmission in case that sidelink channel state information (SL-CSI) reporting is triggered,
        in case that the SL resources are allocated for the new transmission, identifying whether the SL resources can accommodate a media access control (MAC) control element (CE) and a subheader for the SL-CSI reporting based on a result of a logical channel prioritization, and
        trigger a scheduling request for the SL-CSI reporting on a result of the logical channel prioritization in case that the SL resources cannot accommodate the MAC CE and the subheader for the SL-CSI reporting.

10. The terminal of claim 9, wherein the controller is further configured trigger the scheduling request in case that the SL resources are not allocated for the new transmission.

11. The terminal of claim 9, wherein the controller is further configured to determine to not trigger the scheduling request for the SL-CSI reporting in case that the SL resources can accommodate the MAC CE and the subheader for the SL-CSI reporting.

12. The terminal of claim 9, wherein the controller is further configured to start a timer based on triggering the SL-CSI reporting.

13. The terminal of claim 12, wherein the controller is further configured to receive, from a base station via the transceiver, configuration information on a value of the timer.

14. The terminal of claim 12, wherein the controller is further configured to stop the timer for the triggered SL-CSI reporting based on transmitting a MAC CE for the SL-CSI reporting.

15. The terminal of claim 12, wherein the controller is further configured to cancel the triggered SL-CSI reporting upon expiry of the timer for the triggered SL-CSI reporting.

16. The terminal of claim 12, wherein the timer is maintained for each pair of a source layer-2 identifier and a destination layer-2 identifier corresponding to PC5-radio resource control (RRC) connection.

* * * * *